United States Patent
Walsh

(10) Patent No.: US 12,425,454 B1
(45) Date of Patent: Sep. 23, 2025

(54) METHODS AND SYSTEMS FOR NETWORK PATH GENERATION

(71) Applicant: Parry Labs, LLC, Alexandria, VA (US)

(72) Inventor: David Walsh, Alexandria, VA (US)

(73) Assignee: Parry Labs, LLC, Alexandria, VA (US)

( * ) Notice: Subject to any disclaimer, the term of this patent is extended or adjusted under 35 U.S.C. 154(b) by 0 days.

(21) Appl. No.: 18/968,229

(22) Filed: Dec. 4, 2024

(51) Int. Cl.
- *H04L 9/40* (2022.01)
- *H04L 45/00* (2022.01)
- *H04L 45/12* (2022.01)

(52) U.S. Cl.
CPC ............ *H04L 63/20* (2013.01); *H04L 45/124* (2013.01); *H04L 45/20* (2013.01)

(58) Field of Classification Search
CPC ............................... H04L 63/20; H04L 45/20
USPC ............................................................ 726/1
See application file for complete search history.

(56) References Cited

U.S. PATENT DOCUMENTS

| | | | |
|---|---|---|---|
| 11,422,830 B1* | 8/2022 | Hefley | G06F 9/44505 |
| 2023/0283540 A1* | 9/2023 | Mikonis | H04L 45/26 370/252 |

\* cited by examiner

*Primary Examiner* — Anthony D Brown
(74) *Attorney, Agent, or Firm* — Caldwell Intellectual Property Law

(57) ABSTRACT

A system for network path generation is described. The system includes at least a processor and a memory communicatively connected to the at least a processor. The memory contains instructions configuring the at least a processor to receive a transmission data for transmission within a network, identify an origination node and a destination node for the transmission data, and identify a plurality of candidate intermediary nodes based on the origination node the destination node. The at least a processor is also configured to determine a routing protocol for a transmission between the origination node and the destination node, select at least one preferred node from the plurality of candidate intermediary nodes as a function of the routing protocol, and generate a transmission path between the origination node and the destination node as a function of the selecting of the at least one intermediary node.

18 Claims, 8 Drawing Sheets

METHODS AND SYSTEMS FOR NETWORK PATH GENERATION

FIELD OF THE INVENTION

The present invention generally relates to the field of data transmission networking. In particular, the present invention is directed to methods and systems for network path generation.

BACKGROUND

Network communication failures create many problems for users. In certain environments, these failures may have a substantial impact on delivery of important data. Current systems lack the capabilities to transmit information on unreliable networks.

SUMMARY OF THE DISCLOSURE

In an aspect, a system for network path generation is described. The system includes at least a processor and a memory communicatively connected to the at least a processor. The memory contains instructions configuring the at least a processor to receive a transmission data for transmission within a network, identify an origination node and a destination node for the transmission data, and identify a plurality of candidate intermediary nodes based on the origination node the destination node. The at least a processor is also configured to determine a routing protocol for a transmission between the origination node and the destination node, select at least one preferred node from the plurality of candidate intermediary nodes as a function of the routing protocol, and generate a transmission path between the origination node and the destination node as a function of the selecting of the at least one intermediary node.

In another aspect, a method for network path generation is described. The method includes receiving, by at least a processor, a transmission data for transmission within a network, identifying, by the at least a processor, an origination node and a destination node for the transmission data, and identifying, by the at least a processor, a plurality of candidate intermediary nodes based on the origination node the destination node. The method also includes determining, by the at least a processor, a routing protocol for a transmission between the origination node and the destination node, selecting, by the at least a processor, at least one preferred node from the plurality of candidate intermediary nodes as a function of the routing protocol, and generating, by the at least a processor, a transmission path between the origination node and the destination node as a function of the selecting of the at least one intermediary node.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

Figure 1:
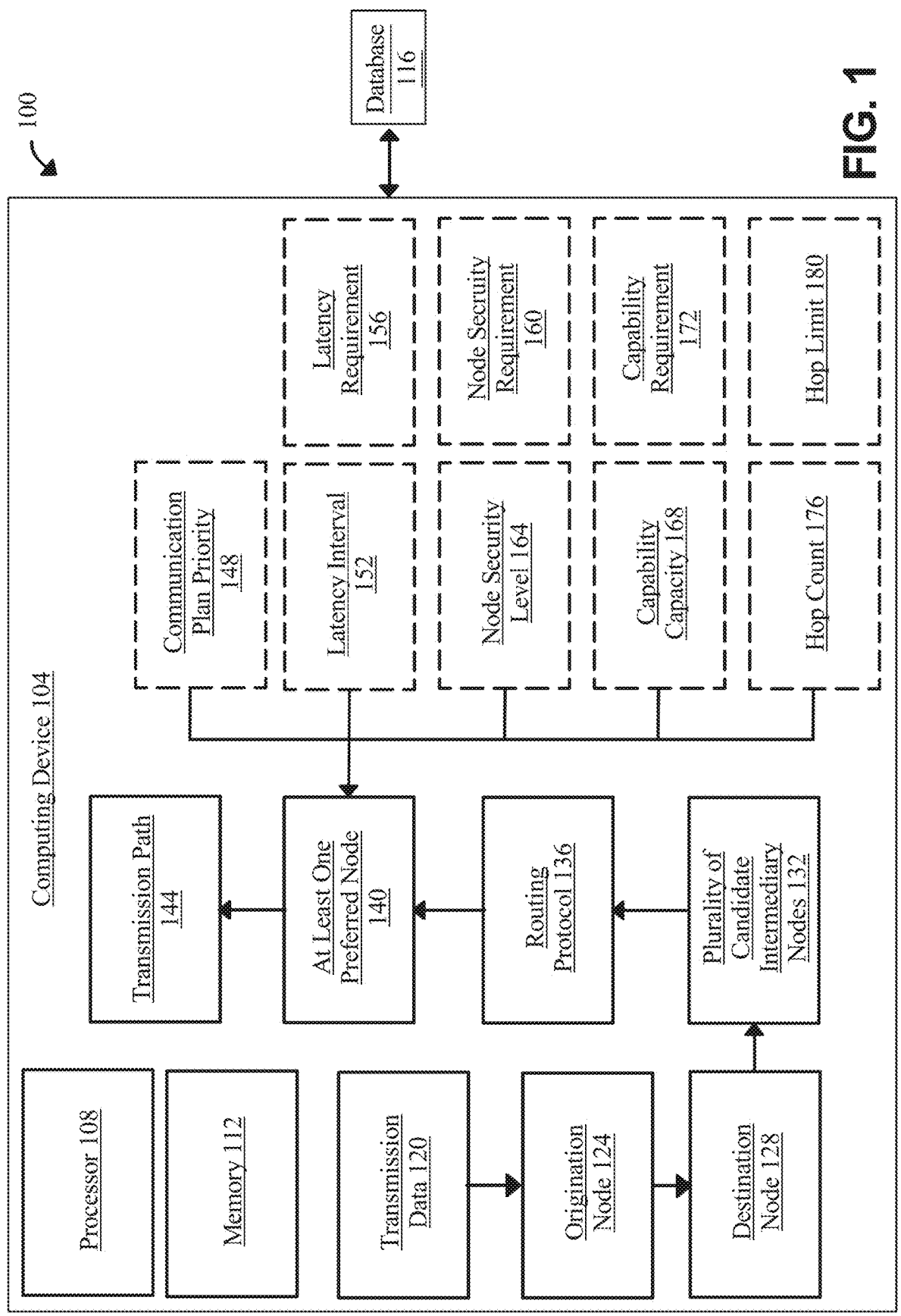
FIG. 1 is a block diagram illustration an exemplary embodiment of a system for network path generation.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

At a high level, aspects of the present disclosure are directed to systems and methods for network path generation. In an embodiment, system includes at least a processor and a memory communicatively connected to the at least a processor. The memory contains instructions configuring the at least a processor to receive a transmission data for transmission within a network, identify a destination node for the transmission data, identify a plurality of intermediary nodes based on an origination node for the transmission data and the destination node. The at least a processor is also configured to determine a routing protocol for a transmission between the origination node and the destination node, select at least one intermediary node of the plurality of intermediary nodes as a function of the routing protocol, and generate a transmission path between the origination node and the destination node as a function of the selecting of the at least one intermediary node.

Aspects of the present disclosure can be used for identification of efficient, robust, and safe network connections from an originating device to a receiving device. In one or more embodiments, aspects of the current disclosure enable effective field communication and connectedness within networks in all environments. In one or more embodiments, aspects of this disclosure further allow for the use of multiple network channels in order to ensure effective field communication and connectedness. Exemplary embodiments illustrating aspects of the present disclosure are described below in the context of several specific examples.

In an embodiment, methods and systems described herein may perform or implement one or more aspects of a cryptographic system. In one embodiment, a cryptographic system is a system that converts data from a first form, known as "plaintext," which is intelligible when viewed in its intended format, into a second form, known as "ciphertext," which is not intelligible when viewed in the same way. Ciphertext may be unintelligible in any format unless first converted back to plaintext. In one embodiment, a process of converting plaintext into ciphertext is known as "encryption." Encryption process may involve the use of a datum, known as an "encryption key," to alter plaintext. Cryptographic system may also convert ciphertext back into plaintext, which is a process known as "decryption." Decryption process may involve the use of a datum, known as a "decryption key," to return the ciphertext to its original plaintext form. In embodiments of cryptographic systems that are "symmetric," decryption key is essentially the same as encryption key: possession of either key makes it possible to deduce the other key quickly without further secret knowledge. Encryption and decryption keys in symmetric cryptographic systems may be kept secret and shared only with persons or entities that the user of the cryptographic system wishes to be able to decrypt the ciphertext. One example of a symmetric cryptographic system is the Advanced Encryption Standard ("AES"), which arranges plaintext into matrices and then modifies the matrices through repeated permutations and arithmetic operations with an encryption key.

In embodiments of cryptographic systems that are "asymmetric," either encryption or decryption key cannot be readily deduced without additional secret knowledge, even given the possession of a corresponding decryption or encryption key, respectively; a common example is a "public key cryptographic system," in which possession of the encryption key does not make it practically feasible to deduce the decryption key, so that the encryption key may safely be made available to the public. An example of a public key cryptographic system is RSA, in which an encryption key involves the use of numbers that are products of very large prime numbers, but a decryption key involves the use of those very large prime numbers, such that deducing the decryption key from the encryption key requires the practically infeasible task of computing the prime factors of a number which is the product of two very large prime numbers. Another example is elliptic curve cryptography, which relies on the fact that given two points P and Q on an elliptic curve over a finite field, and a definition for addition where A+B=-R, the point where a line connecting point A and point B intersects the elliptic curve, where "0," the identity, is a point at infinity in a projective plane containing the elliptic curve, finding a number k such that adding P to itself k times results in Q is computationally impractical, given correctly selected elliptic curve, finite field, and P and Q.

In some embodiments, systems and methods described herein produce cryptographic hashes, also referred to by the equivalent shorthand term "hashes." A cryptographic hash, as used herein, is a mathematical representation of a lot of data, such as files or blocks in a block chain as described in further detail below; the mathematical representation is produced by a lossy "one-way" algorithm known as a "hashing algorithm." Hashing algorithm may be a repeatable process; that is, identical lots of data may produce identical hashes each time they are subjected to a particular hashing algorithm. Because hashing algorithm is a one-way function, it may be impossible to reconstruct a lot of data from a hash produced from the lot of data using the hashing algorithm. In the case of some hashing algorithms, reconstructing the full lot of data from the corresponding hash using a partial set of data from the full lot of data may be possible only by repeatedly guessing at the remaining data and repeating the hashing algorithm; it is thus computationally difficult if not infeasible for a single computer to produce the lot of data, as the statistical likelihood of correctly guessing the missing data may be extremely low. However, the statistical likelihood of a computer of a set of computers simultaneously attempting to guess the missing data within a useful timeframe may be higher, permitting mining protocols as described in further detail below.

In an embodiment, hashing algorithm may demonstrate an "avalanche effect," whereby even extremely small changes to lot of data produce drastically different hashes. This may thwart attempts to avoid the computational work necessary to recreate a hash by simply inserting a fraudulent datum in data lot, enabling the use of hashing algorithms for "tamper-proofing" data such as data contained in an immutable ledger as described in further detail below. This avalanche or "cascade" effect may be evinced by various hashing processes; persons skilled in the art, upon reading the entirety of this disclosure, will be aware of various suitable hashing algorithms for purposes described herein. Verification of a hash corresponding to a lot of data may be performed by running the lot of data through a hashing algorithm used to produce the hash. Such verification may be computationally expensive, albeit feasible, potentially adding up to significant processing delays where repeated hashing, or hashing of large quantities of data, is required, for instance as described in further detail below. Examples of hashing programs include, without limitation, SHA256, a NIST standard; further current and past hashing algorithms include Winternitz hashing algorithms, various generations of Secure Hash Algorithm (including "SHA-1," "SHA-2," and "SHA-3"), "Message Digest" family hashes such as "MD4," "MD5," "MD6," and "RIPEMD," Keccak, "BLAKE" hashes and progeny (e.g., "BLAKE2," "BLAKE-256," "BLAKE-412," and the like), Message Authentication Code ("MAC")-family hash functions such as PMAC, OMAC, VMAC, HMAC, and UMAC, Poly1305-AES, Elliptic Curve Only Hash ("ECOH") and similar hash functions, Fast-Syndrome-based (FSB) hash functions, GOST hash functions, the Grøstl hash function, the HAS-160 hash function, the JH hash function, the RadioGatun hash function, the Skein hash function, the Streebog hash function, the SWIFFT hash function, the Tiger hash function, the Whirlpool hash function, or any hash function that satisfies, at the time of implementation, the requirements that a cryptographic hash be deterministic, infeasible to reverse-hash, infeasible to find collisions, and have the property that small changes to an original message to be hashed will change the resulting hash so extensively that the original hash and the new hash appear uncorrelated to each other. A degree of security of a hash function in practice may depend both on the hash function itself and on characteristics of the message and/or digest used in the hash function. For example, where a message is random, for a hash function that fulfills collision-resistance requirements, a brute-force or "birthday attack" may to detect collision may be on the order of $O(2^{n/2})$ for n output bits; thus, it may take on the order of 2256 operations to locate a collision in a 412 bit output "Dictionary" attacks on hashes likely to have been generated from a non-random original text can have a lower computational complexity, because the space of entries they are guessing is far smaller than the space containing all random permutations of bits. However, the space of possible messages may be augmented by increasing the length or potential length of a possible message, or by implementing a protocol whereby one or more randomly selected strings or sets of data are added to the message, rendering a dictionary attack significantly less effective.

Continuing to refer to FIG. 1, a "secure proof," as used in this disclosure, is a protocol whereby an output is generated that demonstrates possession of a secret, such as device-specific secret, without demonstrating the entirety of the device-specific secret; in other words, a secure proof by itself, is insufficient to reconstruct the entire device-specific secret, enabling the production of at least another secure proof using at least a device-specific secret. A secure proof may be referred to as a "proof of possession" or "proof of knowledge" of a secret. Where at least a device-specific secret is a plurality of secrets, such as a plurality of challenge-response pairs, a secure proof may include an output that reveals the entirety of one of the plurality of secrets, but not all of the plurality of secrets; for instance, secure proof may be a response contained in one challenge-response pair. In an embodiment, proof may not be secure; in other words, proof may include a one-time revelation of at least a device-specific secret, for instance as used in a single challenge-response exchange.

Secure proof may include a zero-knowledge proof, which may provide an output demonstrating possession of a secret while revealing none of the secret to a recipient of the output; zero-knowledge proof may be information-theoretically secure, meaning that an entity with infinite computing power would be unable to determine secret from output. Alternatively, zero-knowledge proof may be computationally secure, meaning that determination of secret from output is computationally infeasible, for instance to the same extent that determination of a private key from a public key in a public key cryptographic system is computationally infeasible. Zero-knowledge proof algorithms may generally include a set of two algorithms, a prover algorithm, or "P," which is used to prove computational integrity and/or possession of a secret, and a verifier algorithm, or "V" whereby a party may check the validity of P. Zero-knowledge proof may include an interactive zero-knowledge proof, wherein a party verifying the proof must directly interact with the proving party; for instance, the verifying and proving parties may be required to be online, or connected to the same network as each other, at the same time. Interactive zero-knowledge proof may include a "proof of knowledge" proof, such as a Schnorr algorithm for proof on knowledge of a discrete logarithm. In a Schnorr algorithm, a prover commits to a randomness r, generates a message based on r, and generates a message adding r to a challenge c multiplied by a discrete logarithm that the prover is able to calculate; verification is performed by the verifier who produced c by exponentiation, thus checking the validity of the discrete logarithm. Interactive zero-knowledge proofs may alternatively or additionally include sigma protocols. Persons skilled in the art, upon reviewing the entirety of this disclosure, will be aware of various alternative interactive zero-knowledge proofs that may be implemented consistently with this disclosure.

Alternatively, zero-knowledge proof may include a non-interactive zero-knowledge, proof, or a proof wherein neither party to the proof interacts with the other party to the proof; for instance, each of a party receiving the proof and a party providing the proof may receive a reference datum which the party providing the proof may modify or otherwise use to perform the proof. As a non-limiting example, zero-knowledge proof may include a succinct non-interactive arguments of knowledge (ZK-SNARKS) proof, wherein a "trusted setup" process creates proof and verification keys using secret (and subsequently discarded) information encoded using a public key cryptographic system, a prover runs a proving algorithm using the proving key and secret information available to the prover, and a verifier checks the proof using the verification key; public key cryptographic system may include RSA, elliptic curve cryptography, ElGamal, or any other suitable public key cryptographic system. Generation of trusted setup may be performed using a secure multiparty computation so that no one party has control of the totality of the secret information used in the trusted setup; as a result, if any one party generating the trusted setup is trustworthy, the secret information may be unrecoverable by malicious parties. As another non-limiting example, non-interactive zero-knowledge proof may include a Succinct Transparent Arguments of Knowledge (ZK-STARKS) zero-knowledge proof. In an embodiment, a ZK-STARKS proof includes a Merkle root of a Merkle tree representing evaluation of a secret computation at some number of points, which may be 1 billion points, plus Merkle branches representing evaluations at a set of randomly selected points of the number of points; verification may include determining that Merkle branches provided match the Merkle root, and that point verifications at those branches represent valid values, where validity is shown by demonstrating that all values belong to the same polynomial created by transforming the secret computation. In an embodiment, ZK-STARKS does not require a trusted setup.

Zero-knowledge proof may include any other suitable zero-knowledge proof. Zero-knowledge proof may include, without limitation, bulletproofs. Zero-knowledge proof may include a homomorphic public-key cryptography (hPKC)-based proof. Zero-knowledge proof may include a discrete logarithmic problem (DLP) proof. Zero-knowledge proof may include a secure multi-party computation (MPC) proof. Zero-knowledge proof may include, without limitation, an incrementally verifiable computation (IVC). Zero-knowledge proof may include an interactive oracle proof (IOP). Zero-knowledge proof may include a proof based on the probabilistically checkable proof (PCP) theorem, including a linear PCP (LPCP) proof. Persons skilled in the art, upon reviewing the entirety of this disclosure, will be aware of various forms of zero-knowledge proofs that may be used, singly or in combination, consistently with this disclosure.

In an embodiment, secure proof is implemented using a challenge-response protocol. In an embodiment, this may function as a one-time pad implementation; for instance, a manufacturer or other trusted party may record a series of outputs ("responses") produced by a device possessing secret information, given a series of corresponding inputs ("challenges"), and store them securely. In an embodiment, a challenge-response protocol may be combined with key generation. A single key may be used in one or more digital signatures as described in further detail below, such as signatures used to receive and/or transfer possession of crypto-currency assets; the key may be discarded for future use after a set period of time. In an embodiment, varied inputs include variations in local physical parameters, such as fluctuations in local electromagnetic fields, radiation, temperature, and the like, such that an almost limitless variety of private keys may be so generated. Secure proof may include encryption of a challenge to produce the response, indicating possession of a secret key. Encryption may be performed using a private key of a public key cryptographic system or using a private key of a symmetric cryptographic system; for instance, trusted party may verify response by decrypting an encryption of challenge or of another datum using either a symmetric or public-key cryptographic system, verifying that a stored key matches the key used for encryption as a function of at least a device-specific secret. Keys may be generated by random variation in selection of prime numbers, for instance for the purposes of a cryptographic system such as RSA that relies prime factoring difficulty. Keys may be generated by randomized selection of parameters for a seed in a cryptographic system, such as elliptic curve cryptography, which is generated from a seed. Keys may be used to generate exponents for a cryptographic system such as Diffie-Helman or ElGamal that are based on the discrete logarithm problem.

Keys may be generated by random variation in selection of prime numbers, for instance for the purposes of a cryptographic system such as secret that relies prime factoring difficulty. Keys may be generated by randomized selection of parameters for a seed in a cryptographic system, such as elliptic curve cryptography, which is generated from a seed. Keys may be used to generate exponents for a cryptographic system such as Diffie-Helman or ElGamal that are based on the discrete logarithm problem.

Cryptographic systems may be configured to generate a session-specific secret. Session-specific secret may include a secret, which may be generated according to any process as described above, that uniquely identifies a particular instance of an attested boot and/or loading of software monitor. Session-specific secret may include without limitation a random number. Session-specific secret may be converted to and/or added to a secure proof, verification datum, and/or key according to any process as described above for generation of a secure proof, verification datum, and/or key from a secret or "seed"; session-specific secret, a key produced therewith, verification datum produced therewith, and/or a secure proof produced therewith may be combined with module-specific secret, a key produced therewith, a verification datum produced therewith, and/or a secure proof produced therewith, such that, for instance, a software monitor and/or other signed element of attested boot and/or attested computing may include secure proof both of session-specific secret and of module-specific secret. In an embodiment, session-specific secret may be usable to identify that a given computation has been performed during a particular attested session, just as device-specific secret may be used to demonstrate that a particular computation has been produced by a particular device. This may be used, e.g., where secure computing module and/or any component thereof is stateless, such as where any such element has no memory that may be overwritten and/or corrupted.

Referring now to FIG. 1, a system 100 for network path generation is described. System 100 includes a computing device 104. System 100 includes a processor 108. Processor 108 may include, without limitation, any processor 108 described in this disclosure. Processor 108 may be included in a and/or consistent with computing device 104. In one or more embodiments, processor 108 may include a multi-core processor. In one or more embodiments, multi-core processor may include multiple processor cores and/or individual processing units. "Processing unit" for the purposes of this disclosure is a device that is capable of executing instructions and performing calculations for a computing device. In one or more embodiments, processing unit may be included within a processor, a core of a processor, an FPGA IP core such as picoblaze, and the like. In one or more embodiments, processing units may retrieve instructions from a memory, decode the data, secure functions and transmit the functions back to the memory. In one or more embodiments, processing units may include an arithmetic logic unit (ALU) wherein the ALU is responsible for carrying out arithmetic and logical operations. This may include, addition, subtraction, multiplication, comparing two data, contrasting two data and the like. In one or more embodiment, processing unit may include a control unit wherein the control unit manages execution of instructions such that they are performed in the correct order. In none or more embodiments, processing unit may include registers wherein the registers may be used for temporary storage of data such as inputs fed into the processor and/or outputs executed by the processor. In one or more embodiments, processing unit may include cache memory wherein memory may be retrieved from cache memory for retrieval of data. In one or more embodiments, processing unit may include a clock register wherein the clock register is configured to synchronize the processor with other computing components. In one or more embodiments, processor 108 may include more than one processing units having at least one or more arithmetic and logic units (ALUs) with hardware components that may perform arithmetic and logic operations. Processing units may further include registers to hold operands and results, as well as potentially "reservation station" queues of registers, registers to store interim results in multi-cycle operations, and an instruction unit/control circuit (including e.g. a finite state machine and/or multiplexor) that reads op codes from program instruction register banks and/or receives those op codes and enables registers/arithmetic and logic operators to read/output values. In one or more embodiments, processing unit may include a floating-point unit (FPU) wherein the FPU is configured to handle arithmetic operations with floating point numbers. In one or more embodiments, processor 108 may include a plurality of processing units wherein each processing unit may be configured for a particular task and/or function. In one or more embodiments, each core within multi-core processor may function independently. In one or more embodiments, each core within multi-core processor may perform functions in parallel with other cores. In one or more embodiments, multi-core processor may allow for a dedicated core for each program and/or software running on a computing system. In one or more embodiments, multiple cores may be used for a singular function and/or multiple functions. In one or more embodiments, multi-core processor may allow for a computing system to perform differing functions in parallel. In one or more embodiments, processor 108 may include a plurality of multi-core processors. Computing device 104 may include any computing device as described in this disclosure, including without limitation a microcontroller, microprocessor, digital signal processor (DSP) and/or system on a chip (SoC) as described in this disclosure. Computing device 104 may include, be included in, and/or communicate with a mobile device such as a mobile telephone or smartphone. Computing device 104 may include a single computing device 104 operating independently or may include two or more computing devices operating in concert, in parallel, sequentially or the like; two or more computing devices may be included together in a single computing device 104 or in two or more computing devices. Computing device 104 may interface or communicate with one or more additional devices as described below in further detail via a network interface device. Network interface device may be utilized for connecting computing device 104 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device 104. Computing device 104 may include but is not limited to, for example, a computing device 104 or cluster of computing devices in a first location and a second computing device 104 or cluster of computing devices in a second location. Computing device 104 may include one or more computing devices dedicated to data storage, security, distribution of traffic for load balancing, and the like. Computing device 104 may distribute one or more computing tasks as described below across a plurality of computing devices of computing device 104, which may operate in parallel, in series, redundantly, or in any other manner used for distribution of tasks or memory 112 between computing devices. Computing device 104 may be implemented, as a non-limiting example, using a "shared nothing" architecture.

With continued reference to FIG. 1, computing device 104 may be designed and/or configured to perform any method, method step, or sequence of method steps in any embodiment described in this disclosure, in any order and with any degree of repetition. For instance, computing device 104 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Computing device 104 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

With continued reference to FIG. 1, computing device 104 may perform determinations, classification, and/or analysis steps, methods, processes, or the like as described in this disclosure using machine-learning processes. A "machine-learning process," as used in this disclosure, is a process that automatedly uses a body of data known as "training data" and/or a "training set" (described further below in this disclosure) to generate an algorithm that will be performed by a Processor module to produce outputs given data provided as inputs; this is in contrast to a non-machine learning software program where the commands to be executed are determined in advance by a user and written in a programming language. A machine-learning process may utilize supervised, unsupervised, lazy-learning processes and/or neural networks, described further below.

With continued reference to FIG. 1, system 100 includes a memory 112 communicatively connected to processor 108, wherein the memory 112 contains instructions configuring processor 108 to perform any processing steps as described herein. As used in this disclosure, "communicatively connected" means connected by way of a connection, attachment, or linkage between two or more relata which allows for reception and/or transmittance of information therebetween. For example, and without limitation, this connection may be wired or wireless, direct, or indirect, and between two or more components, circuits, devices, systems, and the like, which allows for reception and/or transmittance of data and/or signal(s) therebetween. Data and/or signals therebetween may include, without limitation, electrical, electromagnetic, magnetic, video, audio, radio, and microwave data and/or signals, combinations thereof, and the like, among others. A communicative connection may be achieved, for example and without limitation, through wired or wireless electronic, digital, or analog, communication, either directly or by way of one or more intervening devices or components. Further, communicative connection may include electrically coupling or connecting at least an output of one device, component, or circuit to at least an input of another device, component, or circuit. For example, and without limitation, using a bus or other facility for intercommunication between elements of a computing device 104. Communicative connecting may also include indirect connections via, for example and without limitation, wireless connection, radio communication, low power wide area network, optical communication, magnetic, capacitive, or optical coupling, and the like. In some instances, the terminology "communicatively coupled" may be used in place of communicatively connected in this disclosure.

With continued reference to FIG. 1, memory 112 may include a primary memory and a secondary memory. "Primary memory" also known as "random access memory" (RAM) for the purposes of this disclosure is a short-term storage device in which information is processed. In one or more embodiments, during use of computing device 104, instructions and/or information may be transmitted to primary memory wherein information may be processed. In one or more embodiments, information may only be populated within primary memory while a particular software is running. In one or more embodiments, information within primary memory is wiped and/or removed after computing device 104 has been turned off and/or use of a software has been terminated. In one or more embodiments, primary memory may be referred to as "Volatile memory" wherein the volatile memory only holds information while data is being used and/or processed. In one or more embodiments, volatile memory may lose information after a loss of power. "Secondary memory" also known as "storage," "hard disk drive" and the like for the purposes of this disclosure is a long-term storage device in which an operating system and other information is stored. In one or remote embodiments, information may be retrieved from secondary memory and transmitted to primary memory during use. In one or more embodiments, secondary memory may be referred to as non-volatile memory wherein information is preserved even during a loss of power. In one or more embodiments, data within secondary memory cannot be accessed by processor. In one or more embodiments, data is transferred from secondary to primary memory wherein processor 108 may access the information from primary memory.

Still referring to FIG. 1, system 100 may include a database 116. Database may include a remote database 116. Database 116 may be implemented, without limitation, as a relational database, a key-value retrieval database such as a NOSQL database, or any other format or structure for use as database that a person skilled in the art would recognize as suitable upon review of the entirety of this disclosure. Database may alternatively or additionally be implemented using a distributed data storage protocol and/or data structure, such as a distributed hash table or the like. Database 116 may include a plurality of data entries and/or records as described above. Data entries in database may be flagged with or linked to one or more additional elements of information, which may be reflected in data entry cells and/or in linked tables such as tables related by one or more indices in a relational database. Persons skilled in the art, upon reviewing the entirety of this disclosure, will be aware of various ways in which data entries in database may store, retrieve, organize, and/or reflect data and/or records.

With continued reference to FIG. 1, system 100 may include and/or be communicatively connected to a server, such as but not limited to, a remote server, a cloud server, a network server and the like. In one or more embodiments, computing device 104 may be configured to transmit one or more processes to be executed by server. In one or more embodiments, server may contain additional and/or increased processor power wherein one or more processes as described below may be performed by server. For example, and without limitation, one or more processes associated with machine learning may be performed by network server, wherein data is transmitted to server, processed and transmitted back to computing device. In one or more embodiments, server may be configured to perform one or more processes as described below to allow for increased computational power and/or decreased power usage by system computing device 104. In one or more embodiments, computing device 104 may transmit processes to server wherein computing device 104 may conserve power or energy.

With continued reference to FIG. 1, system 100 may include a host circuit. Host circuit includes at least a processor 108 communicatively connected to a memory 112. As used in this disclosure, a "host circuit" is an integrated circuit or a collection of interconnected circuits designed to manage, control, and/or interface with one or more functionalities in a system. In a non-limiting example, host circuit may be configured as a primary platform or base that provides essential infrastructure, resources, and interfaces to facilitate the operation of other connected or integrated components. Hosting circuit may include any computing device as described in this disclosure, including without limitation a microcontroller, microprocessor, digital signal processor (DSP) and/or system on a chip (SoC) that provide one or more services, resources, or data to other computing devices. Host circuit may include, be included in, and/or communicate with a mobile device such as a mobile telephone or smartphone. Host circuit may include a single computing device operating independently, or may include two or more computing device operating in concert, in parallel, sequentially or the like; two or more computing devices may be included together in a single computing device or in two or more computing devices. In some cases, Host circuit may include but is not limited to, for example, a computing device or cluster of computing devices in a first location and a second computing device or cluster of computing devices in a second location. In other cases, host circuit may include a main unit or a primary circuit in a network that controls communications and/or provide a central point of interface. In one or more embodiments, host circuit may be used in lieu of computing device 104. In one or mor embodiments, host circuit may carry out one or more processes as described in this disclosure intended for computing device 104.

With continued reference to FIG. 1, in or more embodiments, system 100 may implement one or more aspects of Future Airborne Computing Environment (FACE). As used in this disclosure, a "Future Airborne Computing Environment" is a technical standard and business strategy for promoting acquisition of open systems software architecture in aviation industry, specifically for military avionics system. In some cases, system 100 may employ FACE approach, wherein a computing device may run in a common operating environment to support one or more portable capability software applications across a plurality of department of defense (DoD) avionics systems. In some cases, FACE may include a plurality of software application programming interfaces (APIs) grouped into "segments." In a non-limiting example, FACE may include operating system segments (OSS), platform specific services segment (PSSS), I/O service segment, transport services segment, and/or the like. In some cases, FACE may provide a bounding box around software items and APIs, i.e., FACE Boundary. In some cases, system 100 may include one or more extensions to FACE that satisfy safety assumptions in hardware outside FACE Boundary. In a non-limiting example, FACE may include a plurality of API groups (i.e., segments), wherein one or more API groups may be dependencies for avionics functional software (i.e., portable component segment [PCS]) to be deployed to FACE. In some cases, such avionics functional software may not need any dependencies. Additionally, or alternatively, FACE may also anticipate one or more hardware resources which software (i.e., portable component segment deployed within the FACE Boundary) may or may not require to satisfy their hardware assumptions and/or dependencies. In a non-limiting example, FACE may include a health monitoring monitor, interface hardware such as Ethernet device driver (within operating system segment) configured to infer specific hardware assumptions.

With continued reference to FIG. 1, processor 108 is configured to receive transmission data 120. "Transmission data," for the purposes of this disclosure, is information to be sent from one node to another node over a network. In an exemplary embodiment, transmission data 120 may be in the form of digital signals, packets, and the like. Further, transmission data 120 may include communication data. As used herein, "communication data" is data related to an exchange of communications between an origination node and at least one destination node, described in more detail herein. For example, communication data may include substance data, metadata, and background data. As used in this disclosure, "substance data" is any data related to the content of communications. For example, substance data may include the content of messages being exchanged, important data being exchanged, and the like. Additionally, "metadata" as used herein is information about the communication. For example, metadata may include timestamps, message size, and the like. Further, as used herein, "background data" is additional contextual data surrounding the transmission. For example, background data may include a location of an origination node and/or at least one destination node, device types for an origination node and/or a destination node, and the like.

Still referring to FIG. 1, in an exemplary embodiment, transmission data may be used to modify, enhance, correct, or otherwise alter an operation, functionality, feature, or performance of an existing computer software computer application, firmware, or hardware component within a designated operating environment. For example, and without limitation, transmission data 120 may include an instruction or a set of instructions to add additional code to a software, to add additional features to a software, instructions to remove a software bug and the like. In one or more embodiments, transmission data 120 may include information such as but not limited to, additional software capabilities, additional system requirements, changes to one or more processes within a system, changes to the visual design of a system, changes to the user interface of a system and the like. In one or more embodiments, transmission data 120 may be used to correct instructions and/or code on a software, to modify the capability of a software and the like. In one or more embodiments, transmission data 120 may include information associated with the software that is to be modified. This may include but is not limited to, the name of the software, compatibility information, system requirements, the date in which transmission data 120 was generated for the software, the version number of transmission data 120, information indicating potential changes to the software, information indicating additions to the software and the like. In one or more embodiments transmission data 120 may include modifications to a weapons system such as but not limited to, guided missile systems, smart bombs, automated defense systems, unmanned aerial vehicles, threat identification systems, Artificial intelligent algorithms, weapons, operational flight programs, avionics systems and the like. In one or more embodiments, transmission data 120 may include modifications to an operating system, modifications to an operating system used for aviation, modifications to an aviation system, modifications to aircraft systems and the like. In one or more embodiments transmission data 120 may include patches to a system or software. A "patch" for the purposes of this disclosure is a set of instructions or code designed to fix specific issues or to improve issues within an existing system. In one or more embodiments, patches may include instructions to modify a code with a faulty system, instructions to make one or more processes more efficient, modifications to security vulnerabilities within a system, modifications to faulty code and the like. In one or more embodiments, patches may be used to address existing issues within a system in order to repair the existing issues.

With continued reference to FIG. 1, transmission data 120 may be iteratively scanned for vulnerabilities, monitored for compliance checks and the like. In one or more embodiments, additions or updates to transmission data 120 may be logged to ensure that any modifications or changes to transmission data 120 are monitored. In one or more embodiments, update data may include a digital signature such as any digital signature as described in this disclosure indicating that transmission data 120 has been tested. In one or more embodiments, the source of the digital signature may indicate the source of a change within update data, the source certifying transmission data 120 and the like. In one or more embodiments, system 100 may utilize a continuous integration/continuous deployment pipeline in order to facilitate testing of update data and ensuring the safety of transmission data 120. In one or more embodiments, in a continuous integration (CI) pipeline, changes are automatically built and tested to ensure that that there are no software related issues. In one or more embodiments, testing transmission data 120 may allow for individuals to certify that transmission data will not cause a software to malfunction. In one or more embodiments, transmission data may be iteratively monitored and tested in order to ensure that transmission data 120 is suitable for a software. In one or more embodiments, monitoring and testing may be logged within a central log (as described in detail below) to ensure that changes are recorded. In one or more embodiments, in a continuous deployment (CD) pipeline, changes to codes and/or software may be automatically implemented following testing. In one or more embodiments, transmission data 120 may be automatically transmitted to operating environments following and implemented within operating environments. In one or more embodiments, following monitoring of transmission data 120, transmission data may be automatically transmitted to operating environments for use.

In one or more embodiments, system 100 may implement a development security operations (DevSecOps) approach wherein security testing and compliance is automated. In one or more embodiments, from creation until deployment, transmission data 120 may be monitored to ensure that transmission data 120 is suitable for use. In one or more embodiments, throughout a creation process of transmission data changes, and the individuals making the changes, may be recorded in order to have a log off all changes to transmission data 120. In one or more embodiments, DevSecOps may allow for vulnerabilities to be tracked and/or to be spotted earlier on as continuous testing may catch an issue immediately after they are made. In one or more embodiments, DevSecOps may allow for increased reliability wherein software issues may be tracked and addressed prior to deployment. In one or more embodiments, transmission data 120 may be stored in artifact repositories wherein artifact repositories include centralized locations for storage and management of transmission data 120. In one or more embodiments, artifact repositories may include database 116 as described in this disclosure. In one or more embodiments, artifact repositories may allow individuals associated with transmission data 120 to store update data and make changes throughout the development cycle of transmission data 120.

With continued reference to FIG. 1, transmission data 120 may include a design assurance level (DAL) classification. A "design assurance level classification," for the purposes of this disclosure in a labeling of software based on the effects caused by a failure of the software. For example, and without limitation, a software failure associated with a first software which can potentially put human lives at risk may receive a particular classification whereas a software failure associated with a second software which may, at most, slightly injure an individual may be given a differing classification. In one or more embodiments, each software may be associated with a particular DAL. DAL classification may range from A-E wherein a DAL-A classification may indicate the software may cause death during failure, whereas as a DAL-E classification may indicate that there is no potential harm in the event of a software failure. In one or more embodiments, various software may be given classifications based on their inherent risk to cause harm to individuals. In one or more embodiments, the DAL of a software may indicate that one software may require more testing, safety protocols and the like in comparison to other software. For example, a DAL-E classified software may not require much testing as failure may not harm individuals, whereas a DAL-A may require stringent testing to ensure that failure does not occur. In one or more embodiments, each DAL certification may contain minimum resource requirements such as minimum processing power, minimum space allocation, and the like. In one or more embodiments, transmission data 120 may contain a DAL certification similar to that of the software and/or software container that is to be modified. In one or more embodiments, a software container may contain software associated with aviation and/or military technology, wherein each software container may contain DAL classification. For example, and without limitation, a software container may include software such as engine control systems, inflight entertainment, missile guidance systems, fuel monitoring systems and the like.

With continued reference to FIG. 1, transmission data 120 may be configured for one or more operating environments. An "operating environment" for the purposes of this disclosure refers to the combination of hardware and software that allows a computer software to function or execute. For example, and without limitation, operating environment may include an operating system, device drivers, virtual machines, software containers, software modules, executable programs and the like. In one or more embodiments, operating environment may allow for the execution of computer software. In one or more embodiments, operating environments may allow for the execution of software modules and/or software containers. In one or more embodiments, operating environment may include any operating environment as described in U.S. Nonprovisional application Ser. No. 18/910,426 filed on Oct. 9, 2024, and entitled "SYSTEMS AND METHODS FOR COMMUNICATION BETWEEN REMOTE ENVIRONMENTS", the entirety of which is incorporated herein by reference.

With continued reference to FIG. 1, software container may include a container image. A "software image," also known as a "container image," as described herein, is a snapshot or a packaged representation of an entire software state, including executable code, configurations, dependencies/libraries, and other required data. In some cases, software image may include source code, libraries, and other software components that the software relies on. In some cases, software image may include one or more configuration files which define a plurality of settings, parameters, and other configurations for the software. In some cases, configuration files may include certain OS configurations, environmental variables, or other system-level settings. In a non-limiting example software image may include a portable executable image combined with a manifest file that is used by a container manager as described below to deploy the software image on an operating environment with appropriate data services and restrictions. In some cases, software image may be used to package a software application with its entire collection of dependencies, ensuring that the software application can run consistently across different SOEs. Exemplary software applications may include, without limitation, flight management system (FMS) software, air traffic control (ATC) software, avionics systems, electronic flight bag (EFB) software, ground support equipment software, weather forecasting and reporting software, cockpit display rendering software, and/or the like.

Still referring to FIG. 1, in some embodiments, software image may include a virtual machine image that encapsulates a whole operating system along with one or more pre-installed software applications. Such software may be easily replicated across a plurality of host circuits e.g., servers or cloud environment. In other cases, software image may be used as a backup snapshot to restore/roll back system or a software application to a known working state. A "software module" for the purposes of this disclosure, is an application or software that is sought to be executed. For example, and without limitation, software module may include a web browser, word processing software, a media player, a digital calculator, flight systems software, military software and the like. In one or more embodiments, software module may include an application that is sought to be executed within software container. In one or more embodiments, any data and/or information within software container may be used to ensure proper execution of software module. In one or more embodiments, software container may contain libraries, dependencies, and the like to ensure proper execution of software module. In one or more embodiments, software module may include an executable file. In one or more embodiments, software module may include third party application wherein 3rd party applications may include software and/or application created and/or managed by a differing entity. In one or more embodiments, software module may include previously developed applications wherein the previously developed applications are modified to interact with a particular environment. In one or more embodiments, software container may allow for a third-party application and/or previously developed application to be deployed within multiple virtual environments and/or operating system.

Continuing to refer to FIG. 1, in one or more embodiments, software module may include a previously developed application and/or 3rd party application wherein software module may be placed within software container to allow for software module to operate within multiple environments. A "software container" for the purpose of this disclosure is an executable package that is capable of running software within an isolated space. For example, and without limitation, software container may include a document drafting software wherein the software container may contain any information, runtime environment and the like necessary to execute the document drafting software on more than one operating systems.

Further referring to FIG. 1, in one or more embodiments, software containers may create a virtualized environment wherein a software may run within the virtualized environment. In one or more embodiments, operating environment may include a virtualized environment. A "virtualized environment," for the purposes of this disclosure is a system in which software may be isolated while still operating on a host operating system. For example, and without limitation, software container may operate in a virtualized environment wherein a software within software container may not communicate with the host operating system. In one or more embodiments, software container may allow for OS level virtualization wherein a software may be isolated from a host operating system while still sharing the host operating system kernel. An "Operating system (OS) level virtualization," for the purposes of this discourse is a system in which an operating system kernel allows the existence of multiple isolated environments. In OS level virtualization, a software within software container may not have access to resources of the host operating system. Instead, the software may only have access to the contents within software container.

Still referring to FIG. 1, in one or more embodiments, operating environment may include a host operating system. A "host operating system" for the purposes of this disclosure is a primary operating system running on processor 108. In one or more embodiments, software container may be executed atop host operating system. In one or more embodiments, virtual operating systems may exist atop host operating system. In one or more embodiments, host operating system may include an operating system configured to allow instantiation of one or more software containers, one or more virtual machines and the like. In one or more embodiments, software container may communicate with host operating system to receive resources from processor 108 and/or memory. In one or more embodiments, an ordinary software operating outside of a software container may have access to various operating system resources such as but not limited to, processing capabilities, file systems, networks and the like. In contrast, a software operating within a software container may only have access to the contents within the software container. This may include various files, network capabilities and the like. In one or more embodiments, a software within software container may communicate with software container wherein software container may transmit the commands to the processor 108.

With continued reference to FIG. 1, in one or more embodiments, software container may contain application-level virtualization. "Application-level virtualization" for the purposes of this disclosure is a system in which a software may be completely encapsulated from a host operating system such that the software may not share the host operating system kernel. In one or more embodiments, in application-level virtualization an application may be encapsulated within a virtual environment as described in further detail below. In one or more embodiments, in application-level virtualization an application may communicate through a virtualization layer such as one created by a hypervisor. In one or more embodiments, application virtualization may include a process in which the application does not rely on the host operating system kernel. In one or more embodiments, software container may contain OS level virtualization wherein a software within software container may be executed in a virtualized environment. In one or more embodiments, software container may contain application virtualization wherein a software may be executed on multiple differing operating systems. In one or more embodiments, in an OS level virtualization, a software may be dependent on the host operating system kernel wherein in an application virtualization, the software may run independent of the host operating system kernel. In one or more embodiments, software container may isolate an application from a surrounding environment wherein the software may operate in a runtime environment. In one or more embodiments, the runtime environment includes everything necessary to allow for isolation of a software from the host operating system. This may include but is not limited to, application and/or software code, dependencies, runtime components needed to execute the application such as access to a database 116, and the like.

With further reference to FIG. 1, in one or more embodiments, a software within software container may operate in a runtime environment wherein the software may be isolated from the host operating system. In one or more embodiments, software container may allow for an application to be executed and/or deployed on multiple operating systems. In one or more embodiments, software container may contain libraries, configuration files, binary code and/or any other information that is necessary to execute the application and/or software. In one or more embodiments, a software container may contain some degree of independence from the operating system and/or host system wherein the software container does not rely on the operating system for any information needed to properly deploy an application within software container. In one or more embodiments, operating systems may lack the proper functionalities to execute an application, wherein software container may be used to ensure that any necessary functionalities, information, and the like are self-contained. In one or more embodiments, software container may contain a container image, wherein the container image is a portable executable image combined with a manifest that is used by a container manager to deploy the container image on an operating environment with appropriate data services and restrictions. In one or more embodiments, software container may contain restrictions and/or instructions on how a software may communicate with the operating system in which it is deployed on. In one or more embodiments, software container may contain a container manager, wherein the container manager has the ability to deploy container images on the operating system. The container manager may interface with container image repositories, validate the authenticity of container images, load container executables into container environments, connect container environments to operating service, and exports management application user interfaces (API) to system management tools. In one or more embodiments, software container may include any software container as described in U.S. Nonprovisional application Ser. No. 18/395,210 filed on Dec. 12, 2023 and entitled "SYSTEM AND METHOD FOR A SAFETY CRITICAL OPERATING ENVIRONMENT CONTAINER ARCHITECTURE", and U.S. Nonprovisional application Ser. No. 18/443,570 filed on Feb. 16, 2024 and entitled "SYSTEM AND METHODS FOR PROVIDING INTEROPERABLE NETWORKS AND COMMUNICATIONS", the entirety of which are incorporated herein by reference.

With continued reference to FIG. 1, transmission data 120 may be configured for one or more operating environments. In one or more embodiments, transmission data 120 may be configured for one or more operating environments wherein transmission data 120 may be used to modify an existing operating system, modify a software module, modify a software, modify a software container, modify a device driver and the like. In one or more embodiments, transmission data 120 may be configured for one or more operating environments wherein information contained within transmission data 120 may be specific to the operating environment in which modification is sought. In one or more embodiments, transmission data 120 may include information associated with the updating environment that is sought to be modified such as but not limited to, information associated with software, information associated with DAL classification and the like. In one or more embodiments, each operating environment may contain DAL classification wherein transmission data 120 may contain the same DAL classification.

With continued reference to FIG. 1, transmission data 120 may include an update or modification for a device driver. A "device driver" also known as a "software driver" for the purposes of this disclosure is a software component configured to control a specific hardware device attached to a computing system. For example, and without limitation, device driver may include a software configured to allow for communication between a storage device and a computing system. In one or more embodiments, device driver may control how a particular hardware device communicates with the computer's operating system. In one or more embodiments, each hardware device on a computing system may contain a unique device driver that controls how the hardware device communicates with the operating system and/or operating environment. In one or more embodiments, differing operating systems may communicate with hardware devices differently. Device drivers may allow for hardware devices to communicate with differing operating systems. In one or more embodiments, device drivers may control the communication between an operating system and a hardware device to ensure proper communication. In one or more embodiments, a device driver may provide a software interface between a virtual environment and a hardware device. In one or more embodiments, transmission data 120 may include an update or modification for a device driver wherein update may alter and/or update how communications are made between the virtual environment and the hardware device. In one or more embodiments, updates and/or modifications may allow for increased computing efficiency, decreased software related issues, increased communication reliability, and the like.

With continued reference to FIG. 1, transmission data 120 may be generated by a user, "User" for the purposes of this disclosure is an individual associated with operating environment and/or a software within operating environment. For example, and without limitation user may include a computer technician, a software engineer, an agent of an entity associated with the creation and/or management of a software that is sought to be updated and the like. In one or more embodiments, a user may be tasked with creating transmission data 120 in order to update or modify an existing software. In one or more embodiments, a user may input instructions and/or code in order to modify one or more aspects of a software. In one or more embodiments, a software may contain various software related issues wherein transmission data 120 may include instructions to resolve the software related issues. In one or more embodiments, transmission data 120 may be generated by a user on computing device 104 and/or a remote device. In one or more embodiments, a remote device may include a device separate from computing device 104, such as but not limited to, a smart phone, a separate desktop computer, a computing device 104 in a differing location and the like. In one or more embodiments, transmission data 120 may be received from a distribution repository. A "distribution repository" for the purposes of this disclosure is a centralized location in which software is stored and made available for installation. In one or more embodiments, distribution repositories may serve as a central network or database in which users may be able to retrieve an install software and/or retrieve transmission data 120. In one or more embodiments, user may include a distribution management entity wherein the distribution management entity is responsible for deploying updates on systems and software. In one or more embodiments, distribution management entity may be responsible for ensuring that software is properly installed and/or modified on a system. In one or more embodiments, distribution management entities may be tasked with retrieving software such as update data and installing the software on an individual's system.

Continuing to refer to FIG. 1, processor 108 is configured to identify an origination node 124. As used herein, "origination node" is a starting point in a network that is an intended source of transmission data. For example, origination node 124 may be a device within network that is configured to source transmission data 120. Additionally, origination node 124 may be configured to create at least one packet for the transmission data 120. As used herein, "packet" is a small segment of data. For example, origination node 124 may be configured to segment transmission data 120 into at least one packet for transmission to a destination node 128. Further, processor 108 may be configured to capture and analyze at least one packet header for the at least one packet to identify the origination node 124.

Still referring to FIG. 1, processor 108 is configured to identify a destination node 128 for the transmission data. As used herein, "destination node" is an endpoint in a network that is an intended recipient of transmission data. For example, destination node 128 may be a device within network that is configured to receive transmission data 120. Additionally, destination node 128 may be configured to recombine the at least one packet for the transmission data 120 from origination node 124. For example, destination node 128 may be configured to receive each of the at least one packet from origination node and combine each of the at least one packet to reform the at least one packet into transmission data 120. Further, processor 108 may be configured to analyze the at least one packet header for the at least one packet to identify the destination node 128.

With further reference to FIG. 1, processor 108 is configured to identify a plurality of candidate intermediary nodes 132 based on the origination node 124 and the destination node 128. As used herein, an "candidate intermediary node" is a device in a network that assists the transfer of data, such as transmission data 120, between an origination node and destination nodes. Intermediary nodes play a crucial role in routing, switching, and managing a flow of data within a network and/or between origination nodes, such as origination node 124, and destination nodes, such as destination node 128. In an exemplary embodiment, plurality of candidate intermediary nodes 132 may be any node that may be used to communicate data between origination node 124 and destination node 128. For example, identifying a plurality of candidate intermediary nodes 132 may include detecting each node and/or device that is communicatively connected within a network. In an embodiment, intermediary nodes 132 may be any of the following: switches, gateways, firewalls, and the like.

With continued reference to FIG. 1, candidate intermediary nodes 132 within a network may be found and/or identified through intermittent connectivity wherein origination node 124, destination node, 128, and candidate intermediary nodes 132 may come into contact within each other when they are within a communication range. In one or more embodiments, when nodes are communicatively connected with each other, the nodes share information such that data is transferred from one node to another. In one or more embodiments, candidate intermediary nodes 132 may be found using periodic beaconing or encounter logging such that data may be transferred from one node to another node. In one or more embodiments, identification of candidate intermediary nodes may include any node discovery as described in U.S. Nonprovisional application Ser. No. 18/967,861 filed on Dec. 4, 2024 and entitled "APPARATUS AND METHOD FOR DISCOVERING AND LINKING SOFTWARE-DEFINED NETWORKING (SDN) NODES IN A COMMUNICATION NETWORK IN OPERATING ENVIRONMENTS", and U.S. Nonprovisional application Ser. No. 18/968,041 filed on Dec. 4, 2024, and entitled "SYSTEM AND METHODS FOR APPARATUS AND METHOD FOR DISCOVERING AND LINKING SOFTWARE-DEFINED NETWORKING (SDN) NODE AND NON-SDI NODE IN A COMMUNICATION NETWORK", the entirety of which are incorporated herein by reference.

Continuing to reference FIG. 1, processor 108 is configured to determine a routing protocol 136 for a transmission between the origination node 124 and the destination node 128. As used herein, "routing protocol" is a set of rules and procedures that governs how nodes communicate with each other to determine an efficient and secure path for forwarding data packets between nodes. For example, a routing protocol may enable nodes to exchange information about network topology, available routes, data traffic, and the like. In one embodiment, processor 108 may be configured to determine routing protocol 136 based on a number of different factors. For example, routing protocol 136 may be determined based on network size, network complexity, network topology, convergence requirements, protocol scalability, network reliability, and the like.

Still referring to FIG. 1, processor 108 is configured to select at least one preferred node 140 of the plurality of intermediary nodes as a function of the routing protocol. As used herein, a "preferred node" is a node that is identified for transmitting information, such as transmission data 120, towards a specified destination. In an embodiment, processor 108 may use predictive modeling to determine which preferred nodes 140 should be selected from the plurality of candidate intermediary nodes 132. In one or more embodiments, predictive modeling may allow for predictions of future and/or anticipated network connections based on historical data, wherein preferred nodes 140 may be selected as a result. In one or more embodiments, processor 108 may use adaptive modeling to reroute data packets in order to increase the transmission rate of data packets. In one or more embodiments, processor 108 may be configured to select preferred nodes based on their ability to transmit data. In one or more embodiments, processor 108 may assign data packets to selected preferred nodes 140 based on the size of data packets and the capacity of preferred nodes 140.

Still referring to FIG. 1, in one or more embodiments, processor 108 may utilize predictive modeling, adaptive modeling, selection of nodes and the like as a function of a machine learning model. The machine learning model may include any machine learning model as described in this disclosure. Processor 108 may use a machine learning module, such as a preferred node machine learning module for the purposes of this disclosure, to implement one or more algorithms or generate one or more machine-learning models, such as a preferred node machine learning model to select at least one preferred node 140. However, the machine learning module is exemplary and may not be necessary to generate one or more machine learning models and perform any machine learning described herein. In one or more embodiments, one or more machine-learning models may be generated using training data. Training data may include inputs and corresponding predetermined outputs so that a machine-learning model may use correlations between the provided exemplary inputs and outputs to develop an algorithm and/or relationship that then allows machine-learning model to determine its own outputs for inputs. Training data may contain correlations that a machine-learning process may use to model relationships between two or more categories of data elements. Exemplary inputs and outputs may come from a database, such as any database described in this disclosure, or provided by a user.

With continued reference to FIG. 1, in other embodiments, a machine-learning module may obtain a training set by querying a communicatively connected database that includes past inputs and outputs. Training data may include inputs from various types of databases, resources, and/or user inputs and outputs correlated to each of those inputs so that a machine-learning model may determine an output. Correlations may indicate causative and/or predictive links between data, which may be modeled as relationships, such as mathematical relationships, by machine-learning models, as described in further detail below. In one or more embodiments, training data may be formatted and/or organized by categories of data elements by, for example, associating data elements with one or more descriptors corresponding to categories of data elements. As a non-limiting example, training data may include data entered in standardized forms by persons or processes, such that entry of a given data element in a given field in a form may be mapped to one or more descriptors of categories. Elements in training data may be linked to categories by tags, tokens, or other data elements. A machine learning module, such as preferred node machine learning module, may be used to create preferred node machine learning model and/or any other machine learning model using training data. Node machine learning model may be trained by correlated inputs and outputs of training data. Training data may be data sets that have already been converted from raw data whether manually, by machine, or any other method. Preferred node training data may be stored in database. Preferred node training data may also be retrieved from database. In some cases, preferred node machine learning model may be trained iteratively using previous inputs correlated to previous outputs. For example, processor 108 may be configured to store preferred nodes and their corresponding transmission from current iterations to train the machine learning model. In some cases, the machine learning model may be trained based on user input. For example, a user may indicate that determined preferred nodes were unreliable and/or slow wherein the machine learning model may be trained as a function of the user input. In some cases, the machine learning model may allow for improvements to computing device 104 such as but not limited to improvements relating to comparing data items, the ability to sort efficiently, an increase in accuracy of analytical methods and the like. In one or more embodiments, preferred node training data may include a plurality of origination nodes and destination nodes correlated to a plurality of preferred nodes. In one or more embodiments origination nodes and destination nodes may be determined based on the source of the transmission and the destination of the transmission.

Continuing to reference FIG. 1, processor 108 is configured to generate a transmission path 144 between the origination node and the destination node as a function of the selecting of the at least one intermediary node. In an embodiment, transmission path 144 may include a route from a source node to a destination node including the at least one preferred node 140.

Continuing to refer to FIG. 1, in one or more embodiments, transmission path machine learning model may be configured to output transmission paths 144 based on origination nodes and destination nodes. In one or more embodiments, transmission path machine learning model may be trained using historical data such as transmissions made on previous iterations. In an embodiment, historical data may indicate the most optical transmission paths 144 between origination node and destination node. In one or more embodiments, following each iteration of the processing of system 100, transmission paths 144 and their corresponding transmission time may be used to iteratively train machine learning model in order to create more efficient transmission paths 144. In one or more embodiments, training of transmission path machine learning model may allow for selection of more efficient transmission paths 144 and may increase the reliability of a transmission. In one or more embodiments, each preferred node 140 may include a correlated storage capacity, wherein the correlated storage capacity may indicate the maximum storage size of a data packet. In one or more embodiments, processor 108 may be configured to assign data packets to transmission paths 144 based on storage size using transmission path machine learning model. In one or more embodiments, processor 108 may be configured to identify a plurality of preferred nodes 140 on a network, wherein processes may be configured to determine transmission path 144 as a function of the plurality of preferred nodes 140. In one or more embodiments, transmission path machine learning model may be configured to receive plurality of preferred nodes 140, including origination node and destination node wherein transmission path machine learning model may be configured to generate transmission path 144 from origination node to destination node. In one or more embodiments, transmission path machine learning model may be trained on transmission path training data wherein transmission path training data contains a plurality of origination nodes and destination nodes correlated to a plurality of transmission paths 144. In one or more embodiments, processor 108 and/or computing device 104 may be associated with an origination node. In one or more embodiments, processor 108 may be configured to determine transmission path 144 as a function of transmission path machine learning model wherein transmission path 144 may indicate a path for transmission data to be transmitted from computing device 104 and/or a central server to operating environment. In one or more embodiments, processor 108 may identify a plurality of preferred nodes 140 to be used for transmission of transmission data wherein transmission path 144 may contain the plurality of preferred nodes 140 and a path along the plurality of preferred nodes 140.

With continued reference to FIG. 1, in a non-limiting example, transmission path 144 may include waveforms and RF (Radio Frequency) mediums such as MANET, 5G, Iridium, Starlink, Ku, Ka, UHF, VHF, and the like. As used in this disclosure, MANET (Mobile Ad Hoc Network) is a self-configuring, decentralized network of mobile devices that communicate with each other over wireless links. Continuing, without limitation, each MANET device may act as both a host and a router, forwarding data to other devices in the network without relying on a fixed infrastructure. As used in this disclosure, "5G" is the fifth-generation cellular network technology. In a non-limiting example, 5G may offer faster speeds, lower latency, and greater capacity compared to previous generations (4G, LTE). Without limitation, 5G may support a wide range of applications, including enhanced mobile broadband, massive IoT connectivity, and low-latency communications. As used in this disclosure, "Iridium" is a satellite communications network composed of a constellation of low Earth orbit (LEO) satellites. Without limitation, Iridium may provide global voice and data communication capabilities. Continuing, Iridium may operate primarily in the L-band frequency range. As used in this disclosure, "Starlink" is a satellite internet constellation. In a non-limiting example, Starlink may include a large network of low Earth orbit (LEO) satellites designed to provide high-speed, low-latency internet connectivity to underserved and remote areas worldwide. Without limitation, Starlink may operate primarily in the Ku- and Ka-bands. As used in this disclosure, "Ku-band" is a portion of the electromagnetic spectrum in the microwave range of frequencies. In a non-limiting example, Ku-band may range from 12 to 18 GHz. As used in this disclosure, "Ka-band" is the frequency range between approximately 26.5 and 40 GHz. Ka-band may be used for high-capacity satellite communications, providing greater bandwidth and faster speeds than Ku-band. As used in this disclosure, "ultra-high frequency (UHF)" is a frequency range between 300 MHz and 3 GHz. In a non-limiting example, UHF may be used in broadcasting, cellular communications, GPS, and military communications. As used in this disclosure, very high frequency (VHF) is the frequency range between 30 MHz and 300 MHz. In a non-limiting example, VHF may be used for television broadcasts, FM radio, two-way radio communications, aviation communication, and the like. Without limitation, VHF signals may travel further than UHF but may require direct line-of-sight due to their limited penetration capabilities.

With continued reference to FIG. 1, processor 108 may be configured to receive a communication plan priority 148. As used herein, a "communication plan priority" is a collection of data indicating an order of priority of form of communications. In an embodiment, communication plan priority 148 may include a primary, alternate, contingency, and emergency (PACE) plan. For example, a PACE plan may be used to designate an order in which communications will move through communication systems until the communication is successfully transmitted/communicated with an intended recipient. Processor 108 may be configured to determine each form of communication within communication plan priority 148 and identify a priority value for each form of communication.

Further referring to FIG. 1, selecting at least one preferred node from the plurality of candidate intermediary nodes may comprise updating the at least one preferred node as a function of the communication plan priority 148. In an exemplary embodiment, communication plan priority 148 may designate a primary node to be included as a preferred node of the at least one preferred node and all transmission data must pass through the primary node if primary node is available and/or capable of handling transmission data. Additionally, or alternatively, communication plan requirement may designate an alternative node to be included as a preferred node of the at least one preferred node in an event where the primary node is not available and all transmission data must pass through the alternative node if alternative node is available and primary node is not available and/or capable of handling transmission data. Further, additionally, or alternatively, communication plan requirement may designate a contingent node to be included as a preferred node of the at least one preferred node in an event where the primary node and alternative node are not available and all transmission data must pass through the contingent node if contingent node is available and primary node and alternative node are not available and/or capable of handling transmission data. Additionally, or alternatively, communication plan requirement may designate an emergency node to be included as a preferred node of the at least one preferred node in an event where the primary node, the alternative node, and the contingent node are not available and all transmission data must pass through the emergency node if emergency node is available and the primary node, the alternative node, and the contingent node are not available and/or capable of handling transmission data.

Still referring to FIG. 1, processor 108 may be configured to calculate a latency interval 152 for the transmission path. As used herein, "latency interval" is a time delay between transmission of a communication from an origination node and receipt of the transmission from the destination node. In an embodiment, calculation of a latency interval 152 may include determining of a propagation delay. "Propagation delay," as used herein, is a time required for a transmission to travel through specified mediums, such fiber optic, wire, and the like. Further, additionally, or alternatively, calculation of a latency interval 152 may include determining of a sequence delay. As used herein, "sequence delay" is a delay of data packets that involves time spent waiting in lines before being processed and/or forwarded at nodes between origination nodes and destination nodes. Additionally, or alternatively, calculation of a latency interval 152 may include determining of a processing delay. As used herein, "processing delay" is a delay caused by slow processing of packets and/or packet headers, slow determinations of routing decisions, and the like.

With further reference to FIG. 1, processor 108 may be configured to compare the latency interval 152 of the transmission path and a latency requirement 156 for a transmission. As used herein, "latency requirement" is the longest allowable delay for transmission of transmission data 120 from origination node 124 to destination node 128. A latency requirement 156 may be used to specify how quickly transmission data 120 may be transmitted by origination node and received by destination node to maintain efficient, robust, and safe network connections. In an exemplary embodiment, latency requirement 156 may be received by a user input. For example, transmission data may need to be received within a time interval specified by user input in order to ensure transmission data has not been tampered with, efficient and safe communication of transmission data, and the like.

Continuing to reference FIG. 1, selecting at least one preferred node from the plurality of intermediary nodes may comprise updating the at least one preferred node 140 as a function of the comparison of the latency interval 152 and the latency requirement 156. In an exemplary embodiment, when a latency interval 152 is greater than the latency requirement 156, processor 108 may be configured to determine a path including the at least one preferred node 140 may not meet performance requirements for transmission data, network, user requirement and the like and select different candidate intermediary nodes 132 as at least one preferred node 140. Additionally, or alternatively, processor 108 may be configured to select other nodes from the plurality of candidate intermediary nodes 132 as the at least one preferred node 140. Further, additionally, or alternatively, processor 108 may be configured to maintain at least one preferred node 140 as selected node(s) when a latency interval 152 is less than the latency requirement 156.

Still referring to FIG. 1, processor 108 may be configured to receive a node security requirement 160. As used herein, "node security requirements" are specific security measures and protocols that must be implemented to by individual nodes within a network. These requirements help ensure the integrity and performance of resources associated with each node and the network as whole. In an embodiment, node security requirements 160 may include access control requirements for nodes, data protection requirements, network security requirements, regulatory compliance requirements, and the like. In one embodiment, access controls may include user authentication requirements and user authorization requirements. User authentication requirements may be a level of security necessary to ensure that only users who are authorized to access nodes are capable of accessing these nodes. Further, user authorization requirements may be a level of security necessary to limit access to nodes to only users who have roles and/or permissions to do so. Additionally, data protection requirements are levels of data control to maintain data integrity. For example, data protection requirements may include data encryption requirements to prevent unauthorized access to sensitive data and data backup requirements to ensure data is capable of being restored to an uncompromised state.

Continuing to refer to FIG. 1, processor 108 may be configured to compare a node security level 164 for each of the at least one preferred node 140 and the node security requirement 160. As used herein, "node security level" is a level of security implemented by each of the at least one preferred node 140. Node security level 164 may be used to specify different measures of protection implemented by nodes. In an exemplary embodiment, processor 108 may be configured to determine node security levels 164 based on data received from each at least one preferred node. For example, processor 108 may be configured to communicate with each of the at least one preferred node 140 and determine node security levels 164 based on the communication and exchange of information.

With continued reference to FIG. 1, selecting at least one preferred node of the plurality of candidate intermediary nodes as a function of the routing protocol may comprise updating the at least one preferred node 140 as a function of the comparison of each of the node security level 164 and the node security requirement 160. In an exemplary embodiment, when a node security level 164 does not meet node security requirements 160, processor 108 may be configured to determine the at least one preferred node 140 may not meet security and protection requirements for transmission data, network, user requirements and the like and select different candidate intermediary nodes 132 as at least one preferred node 140. Additionally, or alternatively, processor 108 may be configured to select other nodes from the plurality of candidate intermediary nodes 132 as the at least one preferred node 140. Further, additionally, or alternatively, processor 108 may be configured to maintain at least one preferred node 140 as selected node(s) when a latency interval 152 is less than the latency requirement 156.

Further referring to FIG. 1, processor 108 may be configured to determine a capability capacity 168 of the transmission path 144. As used herein, "capability capacity" is a maximum rate of data transfer across a transmission path. Capability capacity 168 is an important consideration in determining whether transmission path including at least one preferred node is capable of transmitting the transmission data efficiently and safely. In an exemplary embodiment, processor 108 may be configured to measure a capability capacity 168 by sending test data using transmission path 144 and determining the capability capacity 168 based on the sending of the data. Additionally, or alternatively, processor 108 may be configured to receive a capability capacity 168 from a network monitoring tool. As used herein, a "network monitoring tool" is a software or a system configured to observe, analyze, and manage the performance and health of a network. Network monitoring tool may be configured to survey traffic and other network activity and determine a capability capacity 168 based on the surveying of traffic.

Still referring to FIG. 1, processor 108 may be configured to compare the capability capacity 168 of the transmission path 144 and a capability requirement 172 for a transmission. As used herein, "capability requirement" is the minimum amount of data transfer capacity needed to effectively support transmission of transmission data 120 from origination node 124 to destination node 128. A capability requirement 172 may be used to specify how much a transmission path is capable of supporting at a given time to maintain efficient, robust, and safe network connections. In an exemplary embodiment, capability requirement 172 may be received by a user input. For example, transmission data may need to be transferred at a certain rate specified by user input in order to ensure transmission data has not been tampered with, efficient and safe communication of transmission data, and the like.

With further reference to FIG. 1, selecting at least one intermediary node of the plurality of intermediary nodes as a function of the routing protocol may comprise updating the at least one preferred node 140 as a function of the comparison the capability capacity 168 and the capability requirement 172. In an exemplary embodiment, when a capability capacity 168 is greater than the capability requirement 172, processor 108 may be configured to use the at least one preferred node 140 for transmission path and no further changes are needed. Additionally, or alternatively, processor 108 may be configured to select other nodes from the plurality of candidate intermediary nodes 132 as the at least one preferred node 140. For example, processor 108 may be configured to determine a path including the at least one preferred node 140 may not meet performance requirements for transmission data, network, user requirement and the like and select different candidate intermediary nodes 132 as at least one preferred node 140 when a capability capacity 168 is less than the capability requirement 172.

With continued reference to FIG. 1, selecting at least one intermediary node of the plurality of intermediary nodes as a function of the routing protocol may comprise updating the at least one preferred node 140 as a function of a quality of service (QOS). As used in this disclosure, a QoS is the ability of a network or system to provide a certain level of performance to a specific application, data flow, or user. In a non-limiting example, the QoS may include managing network resources by prioritizing certain types of traffic, minimizing latency, reducing packet loss, maintaining consistent data throughput, and the like. Without limitation, the QoS may include policies to ensure that a network can meet performance requirements, enhancing the overall user experience and system reliability. For example, the QoS policies may prioritize traffic, such as video and audio packets, over other types of data, such as background file downloads. Continuing, the QoS may help ensure that the video and audio streams are transmitted smoothly, minimizing delays and/or interruptions.

With continued reference to FIG. 1, selecting at least one intermediary node of the plurality of intermediary nodes as a function of the routing protocol may comprise updating the at least one preferred node 140 as a function of an allowable service level (ASL). As used in this disclosure, an ASL is the minimum performance criteria or quality metrics that a specific network link must meet to be considered acceptable or functional. For example, without limitation, each intermediary node may need to provide at least 1 Mbps of bandwidth for sensor data to be reliably transmitted to a central server. Continuing, an ASL policy may ensure that only intermediary nodes capable of maintaining this bandwidth threshold are selected.

Continuing to reference FIG. 1, processor 108 may be configured to determine a hop count 176 of the transmission path. As used herein, "hop count" is a metric indicating a number of intermediate nodes that data packets pass through as they travel from an origination node to a destination node. Hop count 176 may be useful to provide insights into the network's topology, indicating how many devices are involved in delivering data across a network. In an exemplary embodiment, processor 108 may be configured to determine a hop count 176 by counting a number of nodes include as part of the at least one preferred node 140 and/or a number of nodes included in transmission path 144.

Still referring to FIG. 1, processor 108 may be configured to compare the hop count 176 and a hop limit 180 for a transmission. As used herein, "hop limit" is the maximum number of nodes included in a transmission from an origination node to a destination node. A hop limit 180 may be used to specify how many nodes a transmission may pass through during communication from origination node to destination node to maintain efficient, robust, and safe network connections. In an exemplary embodiment, hop count 176 may be received by a user input. For example, transmission data may be allowed to only pass through a certain number of nodes before being received by a destination node specified by user input in order to ensure transmission data has not been tampered with, efficient and safe communication of transmission data, and the like.

With continued reference to FIG. 1, selecting at least one intermediary node of the plurality of intermediary nodes may comprise updating the at least one preferred node 140 as a function of the comparison of the hop count 176 and the hop limit 180. In an exemplary embodiment, when a hop count 176 is greater than the hop limit 180, processor 108 may be configured to determine a transmission path 144 including the at least one preferred node 140 may not meet performance requirements for transmission data, network, user requirement and the like and select different candidate intermediary nodes 132 as at least one preferred node 140 to reduce a hop count 176 to meet the hop limit 180. Further, additionally, or alternatively, processor 108 may be configured to maintain at least one preferred node 140 as selected node(s) when a hop count 176 is less than the hop limit 180.

Figure 2:
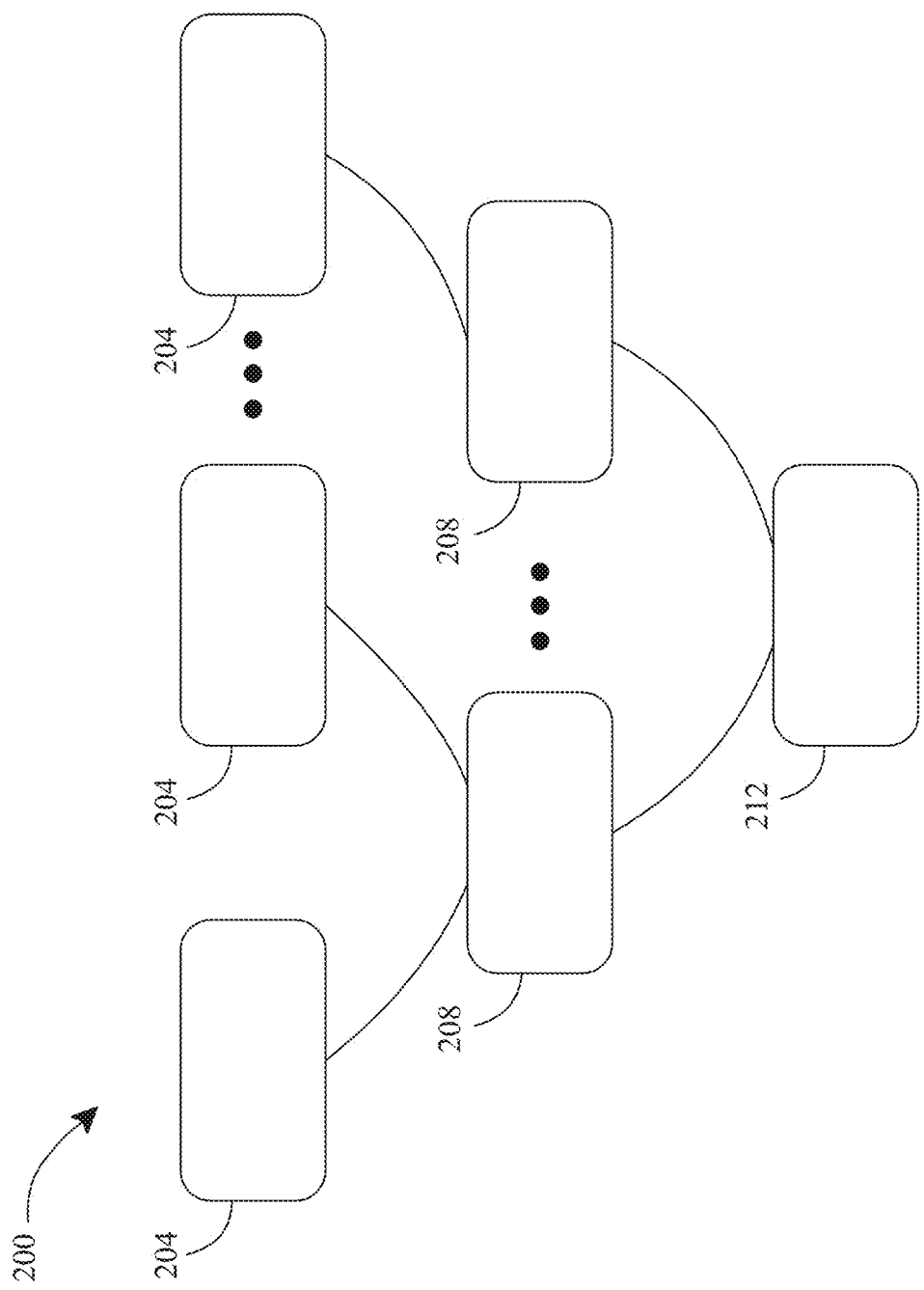
FIG. 2 illustrates an exemplary embodiment of a cryptographic accumulator.

Referring now to FIG. 2, an exemplary embodiment of a cryptographic accumulator 200 is illustrated. A "cryptographic accumulator," as used in this disclosure, is a data structure created by relating a commitment, which may be smaller amount of data that may be referred to as an "accumulator" and/or "root," to a set of elements, such as lots of data and/or collection of data, together with short membership and/or non-membership proofs for any element in the set. In an embodiment, these proofs may be publicly verifiable against the commitment. An accumulator may be said to be "dynamic" if the commitment and membership proofs can be updated efficiently as elements are added or removed from the set, at unit cost independent of the number of accumulated elements; an accumulator for which this is not the case may be referred to as "static." A membership proof may be referred to as a as a "witness" whereby an element existing in the larger amount of data can be shown to be included in the root, while an element not existing in the larger amount of data can be shown not to be included in the root, where "inclusion" indicates that the included element was a part of the process of generating the root, and therefore was included in the original larger data set. Cryptographic accumulator 200 has a plurality of accumulated elements 204, each accumulated element 204 generated from a lot of the plurality of data lots. Accumulated elements 204 are created using an encryption process, defined for this purpose as a process that renders the lots of data unintelligible from the accumulated elements 204; this may be a one-way process such as a cryptographic hashing process and/or a reversible process such as encryption. Cryptographic accumulator 200 further includes structures and/or processes for conversion of accumulated elements 204 to root 212 element. For instance, and as illustrated for exemplary purposes in FIG. 2, cryptographic accumulator 200 may be implemented as a Merkle tree and/or hash tree, in which each accumulated element 204 created by cryptographically hashing a lot of data. Two or more accumulated elements 204 may be hashed together in a further cryptographic hashing process to produce a node 208 element; a plurality of node 208 elements may be hashed together to form parent nodes 208, and ultimately a set of nodes 208 may be combined and cryptographically hashed to form root 212. Contents of root 212 may thus be determined by contents of nodes 208 used to generate root 212, and consequently by contents of accumulated elements 204, which are determined by contents of lots used to generate accumulated elements 204. As a result of collision resistance and avalanche effects of hashing algorithms, any change in any lot, accumulated element 204, and/or node 208 is virtually certain to cause a change in root 212; thus, it may be computationally infeasible to modify any element of Merkle and/or hash tree without the modification being detectable as generating a different root 212. In an embodiment, any accumulated element 204 and/or all intervening nodes 208 between accumulated element 204 and root 212 may be made available without revealing anything about a lot of data used to generate accumulated element 204; lot of data may be kept secret and/or demonstrated with a secure proof as described below, preventing any unauthorized party from acquiring data in lot.

Alternatively, or additionally, and still referring to FIG. 2, cryptographic accumulator 200 may include a "vector commitment" which may act as an accumulator in which an order of elements in set is preserved in its root 212 and/or commitment. In an embodiment, a vector commitment may be a position binding commitment and can be opened at any position to a unique value with a short proof (sublinear in the length of the vector). A Merkle tree may be seen as a vector commitment with logarithmic size openings. Subvector commitments may include vector commitments where a subset of the vector positions can be opened in a single short proof (sublinear in the size of the subset). Persons skilled in the art, upon reviewing the entirety of this disclosure, will be aware of various alternative or additional cryptographic accumulators 200 that may be used as described herein. In addition to Merkle trees, accumulators may include without limitation RSA accumulators, class group accumulators, and/or bi-linear pairing-based accumulators. Any accumulator may operate using one-way functions that are easy to verify but infeasible to reverse, i.e. given an input it is easy to produce an output of the one-way function, but given an output it is computationally infeasible and/or impossible to generate the input that produces the output via the one-way function. For instance, and by way of illustration, a Merkle tree may be based on a hash function as described above. Data elements may be hashed and grouped together. Then, the hashes of those groups may be hashed again and grouped together with the hashes of other groups; this hashing and grouping may continue until only a single hash remains. As a further non-limiting example, RSA and class group accumulators may be based on the fact that it is infeasible to compute an arbitrary root of an element in a cyclic group of unknown order, whereas arbitrary powers of elements are easy to compute. A data element may be added to the accumulator by hashing the data element successively until the hash is a prime number and then taking the accumulator to the power of that prime number. The witness may be the accumulator prior to exponentiation. Bi-linear paring-based accumulators may be based on the infeasibility found in elliptic curve cryptography, namely that finding a number k such that adding P to itself k times results in Q is impractical, whereas confirming that, given 4 points P, Q, R, S, the point, P needs to be added as many times to itself to result in Q as R needs to be added as many times to itself to result in S, can be computed efficiently for certain elliptic curves.

Figure 3:
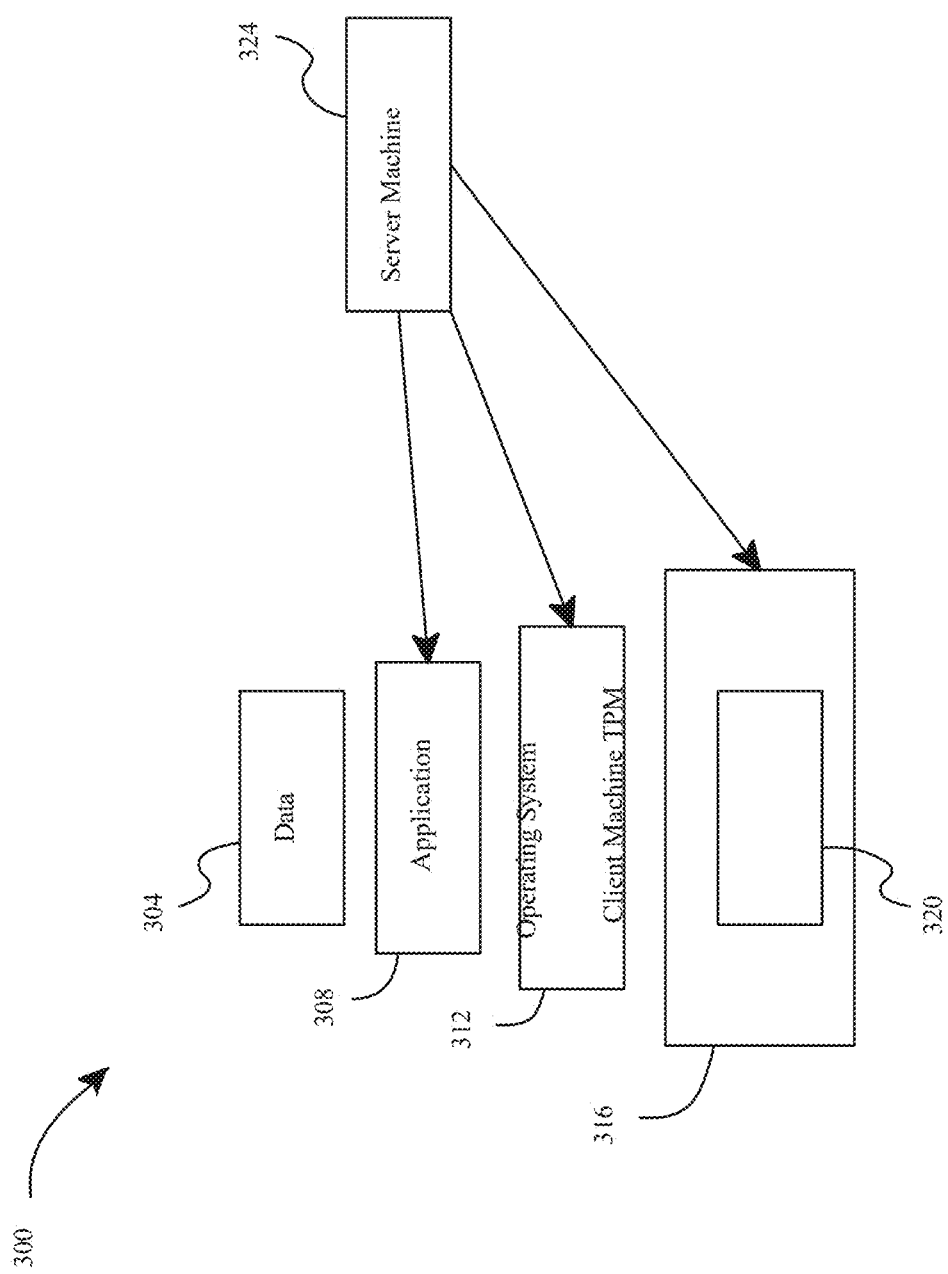
FIG. 3 is an exemplary embodiment of a system for a trusted computing architecture.

Referring now to FIG. 3, an exemplary embodiment of a system 300 for a trusted computing architecture is illustrated. "Trusted computing," as used in this disclosure, is a technology enabling hardware and/or hardware manufacturers to exert control over what software does and does not run on a system by refusing to run unsigned software, and/or to make all software that does run auditable and transparent. In a non-limiting embodiment, trusted computing may which system 312 and application 308 perform one or more actions, determinations, calculations, or the like as described in this disclosure. Trusted computing may also enable integrated data privacy involving NFTs in the launching of the NFTs onto a decentralized exchange platform. Trusted computing may include a plurality of features such as, but not limited to, secure boot configured to allow an operating system to boot into a defined and trusted configuration, curtained memory configured to provide strong memory isolation, a memory configured to be unreadable by other processes including operating systems and debuggers, sealed storage configured to allow software to keep cryptographically secure secrets, secure I/O thwarts configured to attack key-stroke loggers and screen scrapers, integrity measurement configured to compute hashes of executable code, configuration data 304, and other system state information, and remote attestation configured to allow a trusted device to present reliable evidence to remote parties about the software it is running.

In a non-limiting embodiment, and still referring to FIG. 3, trusted computing may include a secure coprocessor and/or cryptoprocessor such as without limitation a Trusted Platform Module (TPM) 320. A "Trusted Platform Module," as used in this disclosure, is a tamper resistant piece of cryptographic hardware built onto a system board or other hardware that implements primitive cryptographic functions on which more complex features can be built. A client machine 316 may be integrated with TPM 320 architecture which a server machine 324 may verify. In a non-limiting embodiment, client machine 316 may be consistent with a computing device as described in the entirety of this disclosure. In another non-limiting embodiment, client machine 316 may be consistent with system 100. In a non-limiting embodiment, TPM may be configured to serve as a local root of trust for the operations of attestation. TPM may be capable of a plurality of security measures such as, but not limited to, performing public key cryptographic operations, computing hash functions, key management and generation, secure storage of keys and other secret data 304, random number generation, integrity measurement, attestation, digital signatures, and the like thereof. In a non-limiting embodiment, the TPM may be manufactured with a public and private key pair, or more generally a secret datum that may be verified using a secure proof, built as an endorsement key (EK) built into hardware, such as without limitation read-only memory (ROM) or the like. An "endorsement key," as used in this disclosure, is encryption key or other secret datum that is permanently embedded in Trusted Platform Module (TPM) security hardware. In a non-limiting embodiment, the EK is unique to a particular TPM and is signed by a trusted server machine 324 such as a certification authority (CA).

In a non-limiting embodiment and still referring to FIG. 3, a TPM may perform an integrity measurement to enable a user and/or process access to private data 304. An "integrity measurement," as used in this disclosure, is a technique to enable a party to query the integrity status of software running on a platform, e.g., through attestation challenges. In a non-limiting embodiment, an integrity measurement may include the process by which information about the software, hardware, and configuration of a system is collected and digested. For example, and without limitation, at load-time, TPM may use a hash function to fingerprint an executable, an executable plus its input data 304, or a sequence of such files. These hash values may be used in attestation to reliably establish code identity to remote or local verifiers such as server machine 324. Hash values can also be used in conjunction with a sealed storage feature. A secret may be sealed along with a list of hash values of programs that are allowed to unseal the secret. This may allow creation of data files that can only be opened by specific applications.

With continued reference to FIG. 3, the TPM may also include security protocols such as attestations. An "attestation," as used in this disclosure, is a mechanism for software to prove and/or record its identity and/or execution history. Attestation may include creating a measurement, or cryptographic hash, of a process's executable code, inputs, and/or outputs, which may be signed by a TPM; this may create a tamper-proof and verifiable record of exactly what process has been performed, with a TPM signature proving that the measurement was performed by and/or with the TPM and on the device indicated. A goal of attestation may be to prove to a remote party that an operating system, main program, and/or application software are intact and trustworthy. A verifier of an attestation may trust that attestation data 304 is accurate because it is signed by TPM 320 whose key may be certified by a CA. Attestation may include a remote attestation. A "remote attestation," as used in this disclosure, is method by which a host (client) authenticates its hardware and software configuration to a remote host (server). The goal of remote attestation is to enable a remote system (challenger) to determine the level of trust in the integrity of platform of another system (attestator). Remote attestation also allows a program to authenticate itself. In some embodiments, remote attestation and remote attestation is a means for one system to make reliable statements about the software it is running to another system. A remote party can then make authorization decisions based on that information. In a non-limiting embodiment, attestation may be performed by TPM 320 configured to serve as a local root of trust for the operations of attestation. In another non-limiting embodiment, an attestation may include a direct anonymous attestation (DAA). A "direct anonymous attestation," as used in this disclosure, is a cryptographic primitive which enables remote authentication of a trusted computer whilst preserving privacy of the platform's user. Persons skilled in the art, upon reviewing the entirety of this disclosure, will be aware of the various embodiments of an attestation protocol for purposes as described herein.

Figure 4:
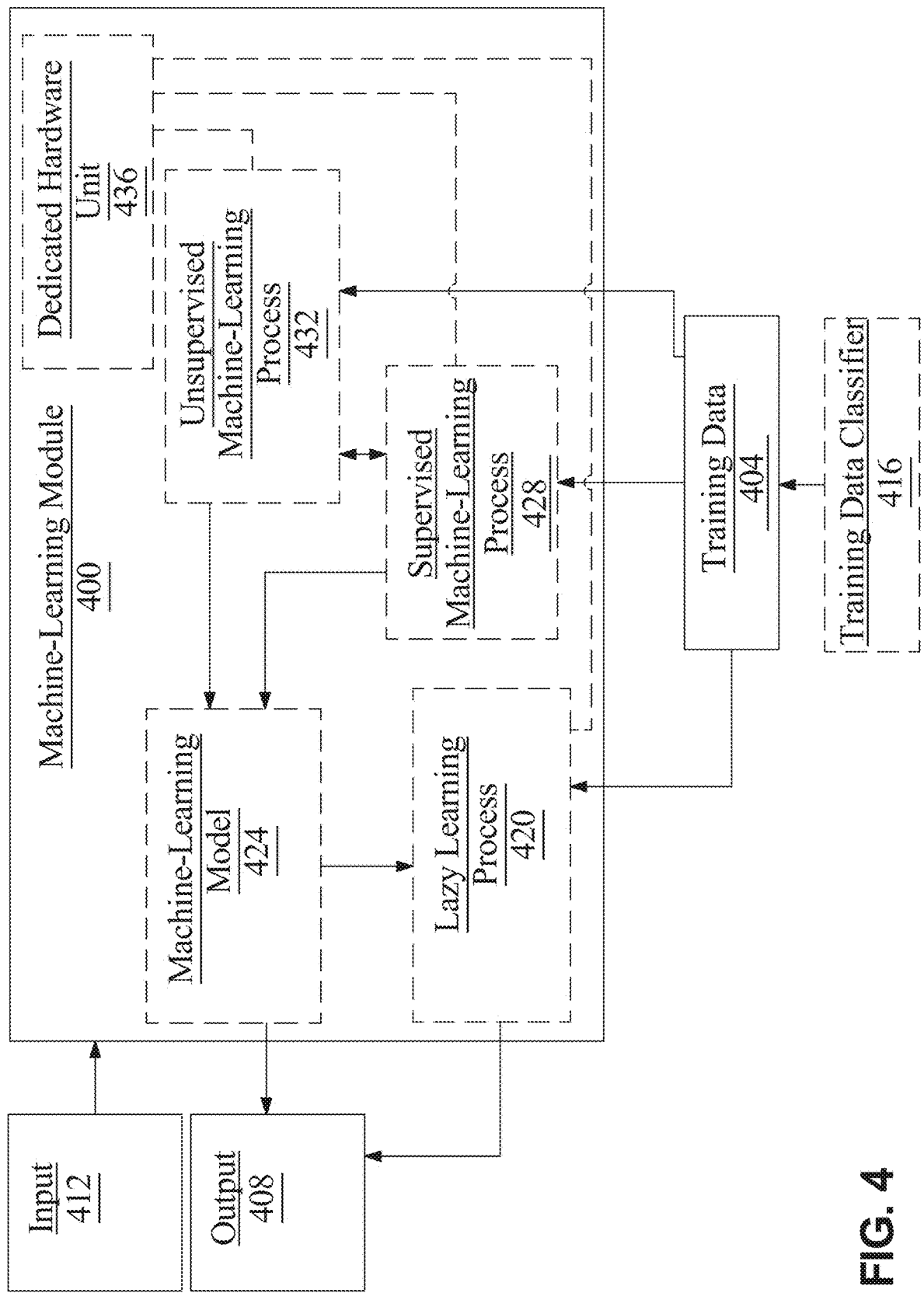
FIG. 4 is a block diagram of an exemplary machine-learning process.

Referring now to FIG. 4, an exemplary embodiment of a machine-learning module 400 that may perform one or more machine-learning processes as described in this disclosure is illustrated. Machine-learning module may perform determinations, classification, and/or analysis steps, methods, processes, or the like as described in this disclosure using machine learning processes. A "machine learning process," as used in this disclosure, is a process that automatedly uses training data 404 to generate an algorithm instantiated in hardware or software logic, data structures, and/or functions that will be performed by a computing device/module to produce outputs 408 given data provided as inputs 412; this is in contrast to a non-machine learning software program where the commands to be executed are determined in advance by a user and written in a programming language.

Still referring to FIG. 4, "training data," as used herein, is data containing correlations that a machine-learning process may use to model relationships between two or more categories of data elements. For instance, and without limitation, training data 404 may include a plurality of data entries, also known as "training examples," each entry representing a set of data elements that were recorded, received, and/or generated together; data elements may be correlated by shared existence in a given data entry, by proximity in a given data entry, or the like. Multiple data entries in training data 404 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 404 according to various correlations; correlations may indicate causative and/or predictive links between categories of data elements, which may be modeled as relationships such as mathematical relationships by machine-learning processes as described in further detail below. Training data 404 may be formatted and/or organized by categories of data elements, for instance by associating data elements with one or more descriptors corresponding to categories of data elements. As a non-limiting example, training data 404 may include data entered in standardized forms by persons or processes, such that entry of a given data element in a given field in a form may be mapped to one or more descriptors of categories. Elements in training data 404 may be linked to descriptors of categories by tags, tokens, or other data elements; for instance, and without limitation, training data 404 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively, or additionally, and continuing to refer to FIG. 4, training data 404 may include one or more elements that are not categorized; that is, training data 404 may not be formatted or contain descriptors for some elements of data. Machine-learning algorithms and/or other processes may sort training data 404 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 404 to be made applicable for two or more distinct machine-learning algorithms as described in further detail below. Training data 404 used by machine-learning module 400 may correlate any input data as described in this disclosure to any output data as described in this disclosure. As a non-limiting illustrative example inputs may include inputs such as source nodes, destination nodes, update data and/or any other inputs as described above, and outputs may include transmission paths 144.

Further referring to FIG. 4, training data may be filtered, sorted, and/or selected using one or more supervised and/or unsupervised machine-learning processes and/or models as described in further detail below; such models may include without limitation a training data classifier 416. Training data classifier 416 may include a "classifier," which as used in this disclosure is a machine-learning model as defined below, such as a data structure representing and/or using a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. A distance metric may include any norm, such as, without limitation, a Pythagorean norm. Machine-learning module 400 may generate a classifier using a classification algorithm, defined as a process whereby a computing device and/or any module and/or component operating thereon derives a classifier from training data 404. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. As a non-limiting example, training data classifier 416 may classify elements of training data to particular network channels wherein each training data set may be classified to a particular network. For example, and without limitation, a first training data set may be classified to cellular networks whereas a second training data set may be classified to satellite networks.

Still referring to FIG. 4, computing device may be configured to generate a classifier using a Naïve Bayes classification algorithm. Naïve Bayes classification algorithm generates classifiers by assigning class labels to problem instances, represented as vectors of element values. Class labels are drawn from a finite set. Naïve Bayes classification algorithm may include generating a family of algorithms that assume that the value of a particular element is independent of the value of any other element, given a class variable. Naïve Bayes classification algorithm may be based on Bayes Theorem expressed as P (A/B)=P (B/A) P (A)=P (B), where P (A/B) is the probability of hypothesis A given data B also known as posterior probability; P (B/A) is the probability of data B given that the hypothesis A was true; P (A) is the probability of hypothesis A being true regardless of data also known as prior probability of A; and P (B) is the probability of the data regardless of the hypothesis. A naïve Bayes algorithm may be generated by first transforming training data into a frequency table. Computing device may then calculate a likelihood table by calculating probabilities of different data entries and classification labels. Computing device may utilize a naïve Bayes equation to calculate a posterior probability for each class. A class containing the highest posterior probability is the outcome of prediction. Naïve Bayes classification algorithm may include a gaussian model that follows a normal distribution. Naïve Bayes classification algorithm may include a multinomial model that is used for discrete counts. Naïve Bayes classification algorithm may include a Bernoulli model that may be utilized when vectors are binary.

With continued reference to FIG. 4, computing device may be configured to generate a classifier using a K-nearest neighbors (KNN) algorithm. A "K-nearest neighbors algorithm" as used in this disclosure, includes a classification method that utilizes feature similarity to analyze how closely out-of-sample-features resemble training data to classify input data to one or more clusters and/or categories of features as represented in training data; this may be performed by representing both training data and input data in vector forms, and using one or more measures of vector similarity to identify classifications within training data, and to determine a classification of input data. K-nearest neighbors algorithm may include specifying a K-value, or a number directing the classifier to select the k most similar entries training data to a given sample, determining the most common classifier of the entries in the database, and classifying the known sample; this may be performed recursively and/or iteratively to generate a classifier that may be used to classify input data as further samples. For instance, an initial set of samples may be performed to cover an initial heuristic and/or "first guess" at an output and/or relationship, which may be seeded, without limitation, using expert input received according to any process as described herein. As a non-limiting example, an initial heuristic may include a ranking of associations between inputs and elements of training data. Heuristic may include selecting some number of highest-ranking associations and/or training data elements.

With continued reference to FIG. 4, generating k-nearest neighbors algorithm may generate a first vector output containing a data entry cluster, generating a second vector output containing an input data, and calculate the distance between the first vector output and the second vector output using any suitable norm such as cosine similarity, Euclidean distance measurement, or the like. Each vector output may be represented, without limitation, as an n-tuple of values, where n is at least two values. Each value of n-tuple of values may represent a measurement or other quantitative value associated with a given category of data, or attribute, examples of which are provided in further detail below; a vector may be represented, without limitation, in n-dimensional space using an axis per category of value represented in n-tuple of values, such that a vector has a geometric direction characterizing the relative quantities of attributes in the n-tuple as compared to each other. Two vectors may be considered equivalent where their directions, and/or the relative quantities of values within each vector as compared to each other, are the same; thus, as a non-limiting example, a vector represented as [5, 10, 15] may be treated as equivalent, for purposes of this disclosure, as a vector represented as [1, 2, 3]. Vectors may be more similar where their directions are more similar, and more different where their directions are more divergent; however, vector similarity may alternatively or additionally be determined using averages of similarities between like attributes, or any other measure of similarity suitable for any n-tuple of values, or aggregation of numerical similarity measures for the purposes of loss functions as described in further detail below. Any vectors as described herein may be scaled, such that each vector represents each attribute along an equivalent scale of values. Each vector may be "normalized," or divided by a "length" attribute, such as a length attribute/as derived using a Pythagorean norm:

$$l = \sqrt{\sum_{i=0}^{n} a_i^2},$$

where $a_i$ is attribute number i of the vector. Scaling and/or normalization may function to make vector comparison independent of absolute quantities of attributes, while preserving any dependency on similarity of attributes; this may, for instance, be advantageous where cases represented in training data are represented by different quantities of samples, which may result in proportionally equivalent vectors with divergent values.

With further reference to FIG. 4, training examples for use as training data may be selected from a population of potential examples according to cohorts relevant to an analytical problem to be solved, a classification task, or the like. Alternatively, or additionally, training data may be selected to span a set of likely circumstances or inputs for a machine-learning model and/or process to encounter when deployed. For instance, and without limitation, for each category of input data to a machine-learning process or model that may exist in a range of values in a population of phenomena such as images, user data, process data, physical data, or the like, a computing device, processor, and/or machine-learning model may select training examples representing each possible value on such a range and/or a representative sample of values on such a range. Selection of a representative sample may include selection of training examples in proportions matching a statistically determined and/or predicted distribution of such values according to relative frequency, such that, for instance, values encountered more frequently in a population of data so analyzed are represented by more training examples than values that are encountered less frequently. Alternatively, or additionally, a set of training examples may be compared to a collection of representative values in a database and/or presented to a user, so that a process can detect, automatically or via user input, one or more values that are not included in the set of training examples. Computing device, processor, and/or module may automatically generate a missing training example; this may be done by receiving and/or retrieving a missing input and/or output value and correlating the missing input and/or output value with a corresponding output and/or input value collocated in a data record with the retrieved value, provided by a user and/or other device, or the like.

Continuing to refer to FIG. 4, computer, processor, and/or module may be configured to preprocess training data. "Preprocessing" training data, as used in this disclosure, is transforming training data from raw form to a format that can be used for training a machine learning model. Preprocessing may include sanitizing, feature selection, feature scaling, data augmentation and the like.

Still referring to FIG. 4, computer, processor, and/or module may be configured to sanitize training data. "Sanitizing" training data, as used in this disclosure, is a process whereby training examples are removed that interfere with convergence of a machine-learning model and/or process to a useful result. For instance, and without limitation, a training example may include an input and/or output value that is an outlier from typically encountered values, such that a machine-learning algorithm using the training example will be adapted to an unlikely amount as an input and/or output; a value that is more than a threshold number of standard deviations away from an average, mean, or expected value, for instance, may be eliminated. Alternatively, or additionally, one or more training examples may be identified as having poor quality data, where "poor quality" is defined as having a signal to noise ratio below a threshold value. Sanitizing may include steps such as removing duplicative or otherwise redundant data, interpolating missing data, correcting data errors, standardizing data, identifying outliers, and the like. In a nonlimiting example, sanitization may include utilizing algorithms for identifying duplicate entries or spell-check algorithms.

As a non-limiting example, and with further reference to FIG. 4, images used to train an image classifier or other machine-learning model and/or process that takes images as inputs or generates images as outputs may be rejected if image quality is below a threshold value. For instance, and without limitation, computing device, processor, and/or module may perform blur detection, and eliminate one or more Blur detection may be performed, as a non-limiting example, by taking Fourier transform, or an approximation such as a Fast Fourier Transform (FFT) of the image and analyzing a distribution of low and high frequencies in the resulting frequency-domain depiction of the image; numbers of high-frequency values below a threshold level may indicate blurriness. As a further non-limiting example, detection of blurriness may be performed by convolving an image, a channel of an image, or the like with a Laplacian kernel; this may generate a numerical score reflecting a number of rapid changes in intensity shown in the image, such that a high score indicates clarity and a low score indicates blurriness. Blurriness detection may be performed using a gradient-based operator, which measures operators based on the gradient or first derivative of an image, based on the hypothesis that rapid changes indicate sharp edges in the image, and thus are indicative of a lower degree of blurriness. Blur detection may be performed using Wavelet-based operator, which takes advantage of the capability of coefficients of the discrete wavelet transform to describe the frequency and spatial content of images. Blur detection may be performed using statistics-based operators take advantage of several image statistics as texture descriptors in order to compute a focus level. Blur detection may be performed by using discrete cosine transform (DCT) coefficients in order to compute a focus level of an image from its frequency content.

Continuing to refer to FIG. 4, computing device, processor, and/or module may be configured to precondition one or more training examples. For instance, and without limitation, where a machine learning model and/or process has one or more inputs and/or outputs requiring, transmitting, or receiving a certain number of bits, samples, or other units of data, one or more training examples' elements to be used as or compared to inputs and/or outputs may be modified to have such a number of units of data. For instance, a computing device, processor, and/or module may convert a smaller number of units, such as in a low pixel count image, into a desired number of units, for instance by upsampling and interpolating. As a non-limiting example, a low pixel count image may have 100 pixels, however a desired number of pixels may be 128. Processor may interpolate the low pixel count image to convert the 100 pixels into 128 pixels. It should also be noted that one of ordinary skill in the art, upon reading this disclosure, would know the various methods to interpolate a smaller number of data units such as samples, pixels, bits, or the like to a desired number of such units. In some instances, a set of interpolation rules may be trained by sets of highly detailed inputs and/or outputs and corresponding inputs and/or outputs downsampled to smaller numbers of units, and a neural network or other machine learning model that is trained to predict interpolated pixel values using the training data. As a non-limiting example, a sample input and/or output, such as a sample picture, with sample-expanded data units (e.g., pixels added between the original pixels) may be input to a neural network or machine-learning model and output a pseudo replica sample-picture with dummy values assigned to pixels between the original pixels based on a set of interpolation rules. As a non-limiting example, in the context of an image classifier, a machine-learning model may have a set of interpolation rules trained by sets of highly detailed images and images that have been downsampled to smaller numbers of pixels, and a neural network or other machine learning model that is trained using those examples to predict interpolated pixel values in a facial picture context. As a result, an input with sample-expanded data units (the ones added between the original data units, with dummy values) may be run through a trained neural network and/or model, which may fill in values to replace the dummy values. Alternatively or additionally, processor, computing device, and/or module may utilize sample expander methods, a low-pass filter, or both. As used in this disclosure, a "low-pass filter" is a filter that passes signals with a frequency lower than a selected cutoff frequency and attenuates signals with frequencies higher than the cutoff frequency. The exact frequency response of the filter depends on the filter design. Computing device, processor, and/or module may use averaging, such as luma or chroma averaging in images, to fill in data units in between original data units.

In some embodiments, and with continued reference to FIG. 4, computing device, processor, and/or module may down-sample elements of a training example to a desired lower number of data elements. As a non-limiting example, a high pixel count image may have 256 pixels, however a desired number of pixels may be 128. Processor may down-sample the high pixel count image to convert the 256 pixels into 128 pixels. In some embodiments, processor may be configured to perform downsampling on data. Downsampling, also known as decimation, may include removing every Nth entry in a sequence of samples, all but every Nth entry, or the like, which is a process known as "compression," and may be performed, for instance by an N-sample compressor implemented using hardware or software. Anti-aliasing and/or anti-imaging filters, and/or low-pass filters, may be used to clean up side-effects of compression.

Further referring to FIG. 4, feature selection includes narrowing and/or filtering training data to exclude features and/or elements, or training data including such elements, that are not relevant to a purpose for which a trained machine-learning model and/or algorithm is being trained, and/or collection of features and/or elements, or training data including such elements, on the basis of relevance or utility for an intended task or purpose for a trained machine-learning model and/or algorithm is being trained. Feature selection may be implemented, without limitation, using any process described in this disclosure, including without limitation using training data classifiers, exclusion of outliers, or the like.

With continued reference to FIG. 4, feature scaling may include, without limitation, normalization of data entries, which may be accomplished by dividing numerical fields by norms thereof, for instance as performed for vector normalization. Feature scaling may include absolute maximum scaling, wherein each quantitative datum is divided by the maximum absolute value of all quantitative data of a set or subset of quantitative data. Feature scaling may include min-max scaling, in which each value X has a minimum value $X_{min}$ in a set or subset of values subtracted therefrom, with the result divided by the range of the values, give maximum value in the set or subset $$X_{max}:X_{new} = \frac{X - X_{min}}{X_{max} - X_{min}}.$$

Feature scaling may include mean normalization, which involves use of a mean value of a set and/or subset of values, $X_{mean}$ with maximum and minimum values:

$$X_{new} = \frac{X - X_{mean}}{X_{max} - X_{min}}.$$

Feature scaling may include standardization, where a difference between X and $X_{mean}$ is divided by a standard deviation σ of a set or subset of values:

$$X_{new} = \frac{X - X_{mean}}{\sigma}.$$

Scaling may be performed using a median value of a set or subset $X_{median}$ and/or interquartile range (IQR), which represents the difference between the $25^{th}$ percentile value and the $50^{th}$ percentile value (or closest values thereto by a rounding protocol), such as:

$$X_{new} = \frac{X - X_{median}}{IQR}.$$

Persons skilled in the art, upon reviewing the entirety of this disclosure, will be aware of various alternative or additional approaches that may be used for feature scaling.

Further referring to FIG. 4, computing device, processor, and/or module may be configured to perform one or more processes of data augmentation. "Data augmentation" as used in this disclosure is addition of data to a training set using elements and/or entries already in the dataset. Data augmentation may be accomplished, without limitation, using interpolation, generation of modified copies of existing entries and/or examples, and/or one or more generative AI processes, for instance using deep neural networks and/or generative adversarial networks; generative processes may be referred to alternatively in this context as "data synthesis" and as creating "synthetic data." Augmentation may include performing one or more transformations on data, such as geometric, color space, affine, brightness, cropping, and/or contrast transformations of images.

Still referring to FIG. 4, machine-learning module 400 may be configured to perform a lazy-learning process 420 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 404. Heuristic may include selecting some number of highest-ranking associations and/or training data 404 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively, or additionally, and with continued reference to FIG. 4, machine-learning processes as described in this disclosure may be used to generate machine-learning models 424. A "machine-learning model," as used in this disclosure, is a data structure representing and/or instantiating a mathematical and/or algorithmic representation of a relationship between inputs and outputs, as generated using any machine-learning process including without limitation any process as described above, and stored in memory; an input is submitted to a machine-learning model 424 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 424 may be generated by creating an artificial neural network, such as a convolutional neural network comprising an input layer of nodes, one or more intermediate layers, and an output layer of nodes. Connections between nodes may be created via the process of "training" the network, in which elements from a training data 404 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 4, machine-learning algorithms may include at least a supervised machine-learning process 428. At least a supervised machine-learning process 428, as defined herein, include algorithms that receive a training set relating a number of inputs to a number of outputs, and seek to generate one or more data structures representing and/or instantiating one or more mathematical relations relating inputs to outputs, where each of the one or more mathematical relations is optimal according to some criterion specified to the algorithm using some scoring function. For instance, a supervised learning algorithm may include inputs such as source nodes, destination nodes, operating environments, a location of system 100 and the like as described above as described above as inputs, transmission paths 144 as described above as outputs, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 404. Persons skilled in the art, upon reviewing the entirety of this disclosure, will be aware of various possible variations of at least a supervised machine-learning process 428 that may be used to determine relation between inputs and outputs. Supervised machine-learning processes may include classification algorithms as defined above.

With further reference to FIG. 4, training a supervised machine-learning process may include, without limitation, iteratively updating coefficients, biases, weights based on an error function, expected loss, and/or risk function. For instance, an output generated by a supervised machine-learning model using an input example in a training example may be compared to an output example from the training example; an error function may be generated based on the comparison, which may include any error function suitable for use with any machine-learning algorithm described in this disclosure, including a square of a difference between one or more sets of compared values or the like. Such an error function may be used in turn to update one or more weights, biases, coefficients, or other parameters of a machine-learning model through any suitable process including without limitation gradient descent processes, least-squares processes, and/or other processes described in this disclosure. This may be done iteratively and/or recursively to gradually tune such weights, biases, coefficients, or other parameters. Updating may be performed, in neural networks, using one or more back-propagation algorithms. Iterative and/or recursive updates to weights, biases, coefficients, or other parameters as described above may be performed until currently available training data is exhausted and/or until a convergence test is passed, where a "convergence test" is a test for a condition selected as indicating that a model and/or weights, biases, coefficients, or other parameters thereof has reached a degree of accuracy. A convergence test may, for instance, compare a difference between two or more successive errors or error function values, where differences below a threshold amount may be taken to indicate convergence. Alternatively, or additionally, one or more errors and/or error function values evaluated in training iterations may be compared to a threshold.

Still referring to FIG. 4, a computing device, processor, and/or module may be configured to perform method, method step, sequence of method steps and/or algorithm described in reference to this figure, in any order and with any degree of repetition. For instance, a computing device, processor, and/or module may be configured to perform a single step, sequence and/or algorithm repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. A computing device, processor, and/or module may perform any step, sequence of steps, or algorithm in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Further referring to FIG. 4, machine learning processes may include at least an unsupervised machine-learning processes 432. An unsupervised machine-learning process, as used herein, is a process that derives inferences in datasets without regard to labels; as a result, an unsupervised machine-learning process may be free to discover any structure, relationship, and/or correlation provided in the data. Unsupervised processes 432 may not require a response variable; unsupervised processes 432 may be used to find interesting patterns and/or inferences between variables, to determine a degree of correlation between two or more variables, or the like.

Still referring to FIG. 4, machine-learning module 400 may be designed and configured to create a machine-learning model 424 using techniques for development of linear regression models. Linear regression models may include ordinary least squares regression, which aims to minimize the square of the difference between predicted outcomes and actual outcomes according to an appropriate norm for measuring such a difference (e.g. a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 4, machine-learning algorithms may include, without limitation, linear discriminant analysis. Machine-learning algorithms may include quadratic discriminant analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include various forms of latent space regularization such as variational regularization. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized trees, AdaBoost, gradient tree boosting, and/or voting classifier methods. Machine-learning algorithms may include neural net algorithms, including convolutional neural net processes.

Still referring to FIG. 4, a machine-learning model and/or process may be deployed or instantiated by incorporation into a program, apparatus, system and/or module. For instance, and without limitation, a machine-learning model, neural network, and/or some or all parameters thereof may be stored and/or deployed in any memory or circuitry. Parameters such as coefficients, weights, and/or biases may be stored as circuit-based constants, such as arrays of wires and/or binary inputs and/or outputs set at logic "1" and "0" voltage levels in a logic circuit to represent a number according to any suitable encoding system including twos complement or the like or may be stored in any volatile and/or non-volatile memory. Similarly, mathematical operations and input and/or output of data to or from models, neural network layers, or the like may be instantiated in hardware circuitry and/or in the form of instructions in firmware, machine-code such as binary operation code instructions, assembly language, or any higher-order programming language. Any technology for hardware and/or software instantiation of memory, instructions, data structures, and/or algorithms may be used to instantiate a machine-learning process and/or model, including without limitation any combination of production and/or configuration of non-reconfigurable hardware elements, circuits, and/or modules such as without limitation ASICs, production and/or configuration of reconfigurable hardware elements, circuits, and/or modules such as without limitation FPGAs, production and/or of non-reconfigurable and/or configuration non-rewritable memory elements, circuits, and/or modules such as without limitation non-rewritable ROM, production and/or configuration of reconfigurable and/or rewritable memory elements, circuits, and/or modules such as without limitation rewritable ROM or other memory technology described in this disclosure, and/or production and/or configuration of any computing device and/or component thereof as described in this disclosure. Such deployed and/or instantiated machine-learning model and/or algorithm may receive inputs from any other process, module, and/or component described in this disclosure, and produce outputs to any other process, module, and/or component described in this disclosure.

Continuing to refer to FIG. 4, any process of training, retraining, deployment, and/or instantiation of any machine-learning model and/or algorithm may be performed and/or repeated after an initial deployment and/or instantiation to correct, refine, and/or improve the machine-learning model and/or algorithm. Such retraining, deployment, and/or instantiation may be performed as a periodic or regular process, such as retraining, deployment, and/or instantiation at regular elapsed time periods, after some measure of volume such as a number of bytes or other measures of data processed, a number of uses or performances of processes described in this disclosure, or the like, and/or according to a software, firmware, or other update schedule. Alternatively or additionally, retraining, deployment, and/or instantiation may be event-based, and may be triggered, without limitation, by user inputs indicating sub-optimal or otherwise problematic performance and/or by automated field testing and/or auditing processes, which may compare outputs of machine-learning models and/or algorithms, and/or errors and/or error functions thereof, to any thresholds, convergence tests, or the like, and/or may compare outputs of processes described herein to similar thresholds, convergence tests or the like. Event-based retraining, deployment, and/or instantiation may alternatively or additionally be triggered by receipt and/or generation of one or more new training examples; a number of new training examples may be compared to a preconfigured threshold, where exceeding the preconfigured threshold may trigger retraining, deployment, and/or instantiation.

Still referring to FIG. 4, retraining and/or additional training may be performed using any process for training described above, using any currently or previously deployed version of a machine-learning model and/or algorithm as a starting point. Training data for retraining may be collected, preconditioned, sorted, classified, sanitized or otherwise processed according to any process described in this disclosure. Training data may include, without limitation, training examples including inputs and correlated outputs used, received, and/or generated from any version of any system, module, machine-learning model or algorithm, apparatus, and/or method described in this disclosure; such examples may be modified and/or labeled according to user feedback or other processes to indicate desired results, and/or may have actual or measured results from a process being modeled and/or predicted by system, module, machine-learning model or algorithm, apparatus, and/or method as "desired" results to be compared to outputs for training processes as described above.

Redeployment may be performed using any reconfiguring and/or rewriting of reconfigurable and/or rewritable circuit and/or memory elements; alternatively, redeployment may be performed by production of new hardware and/or software components, circuits, instructions, or the like, which may be added to and/or may replace existing hardware and/or software components, circuits, instructions, or the like.

Further referring to FIG. 4, one or more processes or algorithms described above may be performed by at least a dedicated hardware unit 436. A "dedicated hardware unit," for the purposes of this figure, is a hardware component, circuit, or the like, aside from a principal control circuit and/or processor performing method steps as described in this disclosure, that is specifically designated or selected to perform one or more specific tasks and/or processes described in reference to this figure, such as without limitation preconditioning and/or sanitization of training data and/or training a machine-learning algorithm and/or model. A dedicated hardware unit 436 may include, without limitation, a hardware unit that can perform iterative or massed calculations, such as matrix-based calculations to update or tune parameters, weights, coefficients, and/or biases of machine-learning models and/or neural networks, efficiently using pipelining, parallel processing, or the like; such a hardware unit may be optimized for such processes by, for instance, including dedicated circuitry for matrix and/or signal processing operations that includes, e.g., multiple arithmetic and/or logical circuit units such as multipliers and/or adders that can act simultaneously and/or in parallel or the like. Such dedicated hardware units 436 may include, without limitation, graphical processing units (GPUs), dedicated signal processing modules, FPGA or other reconfigurable hardware that has been configured to instantiate parallel processing units for one or more specific tasks, or the like, A computing device, processor, apparatus, or module may be configured to instruct one or more dedicated hardware units 436 to perform one or more operations described herein, such as evaluation of model and/or algorithm outputs, one-time or iterative updates to parameters, coefficients, weights, and/or biases, and/or any other operations such as vector and/or matrix operations as described in this disclosure.

Figure 5:
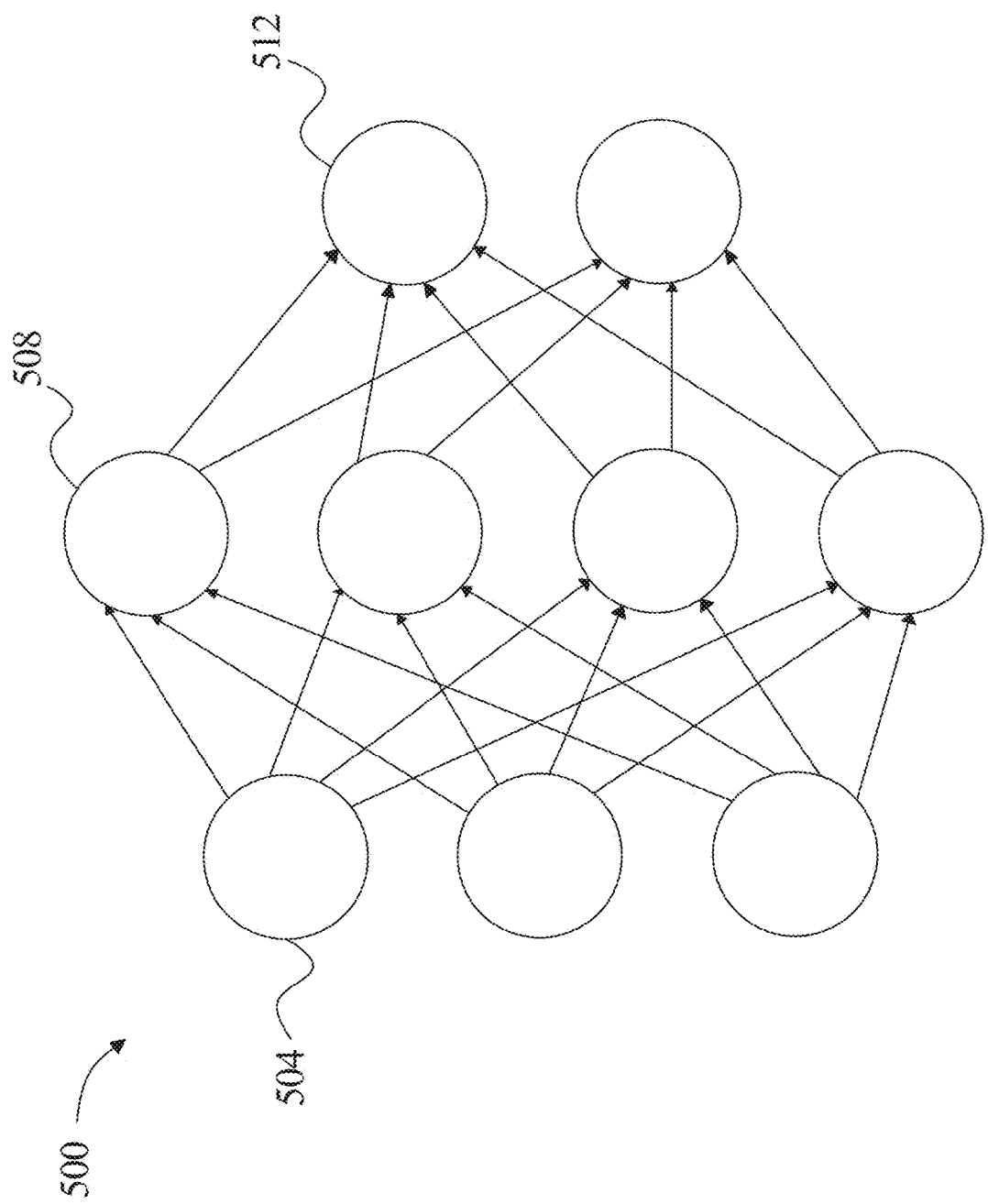
FIG. 5 is a diagram of an exemplary embodiment of a neural network.

Referring now to FIG. 5, an exemplary embodiment of neural network 500 is illustrated. A neural network 500 also known as an artificial neural network, is a network of "nodes," or data structures having one or more inputs, one or more outputs, and a function determining outputs based on inputs. Such nodes may be organized in a network, such as without limitation a convolutional neural network, including an input layer of nodes 504, one or more intermediate layers 508, and an output layer of nodes 512. Connections between nodes may be created via the process of "training" the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning. Connections may run solely from input nodes toward output nodes in a "feed-forward" network or may feed outputs of one layer back to inputs of the same or a different layer in a "recurrent network." As a further non-limiting example, a neural network may include a convolutional neural network comprising an input layer of nodes, one or more intermediate layers, and an output layer of nodes. A "convolutional neural network," as used in this disclosure, is a neural network in which at least one hidden layer is a convolutional layer that convolves inputs to that layer with a subset of inputs known as a "kernel," along with one or more additional layers such as pooling layers, fully connected layers, and the like.

Figure 6:
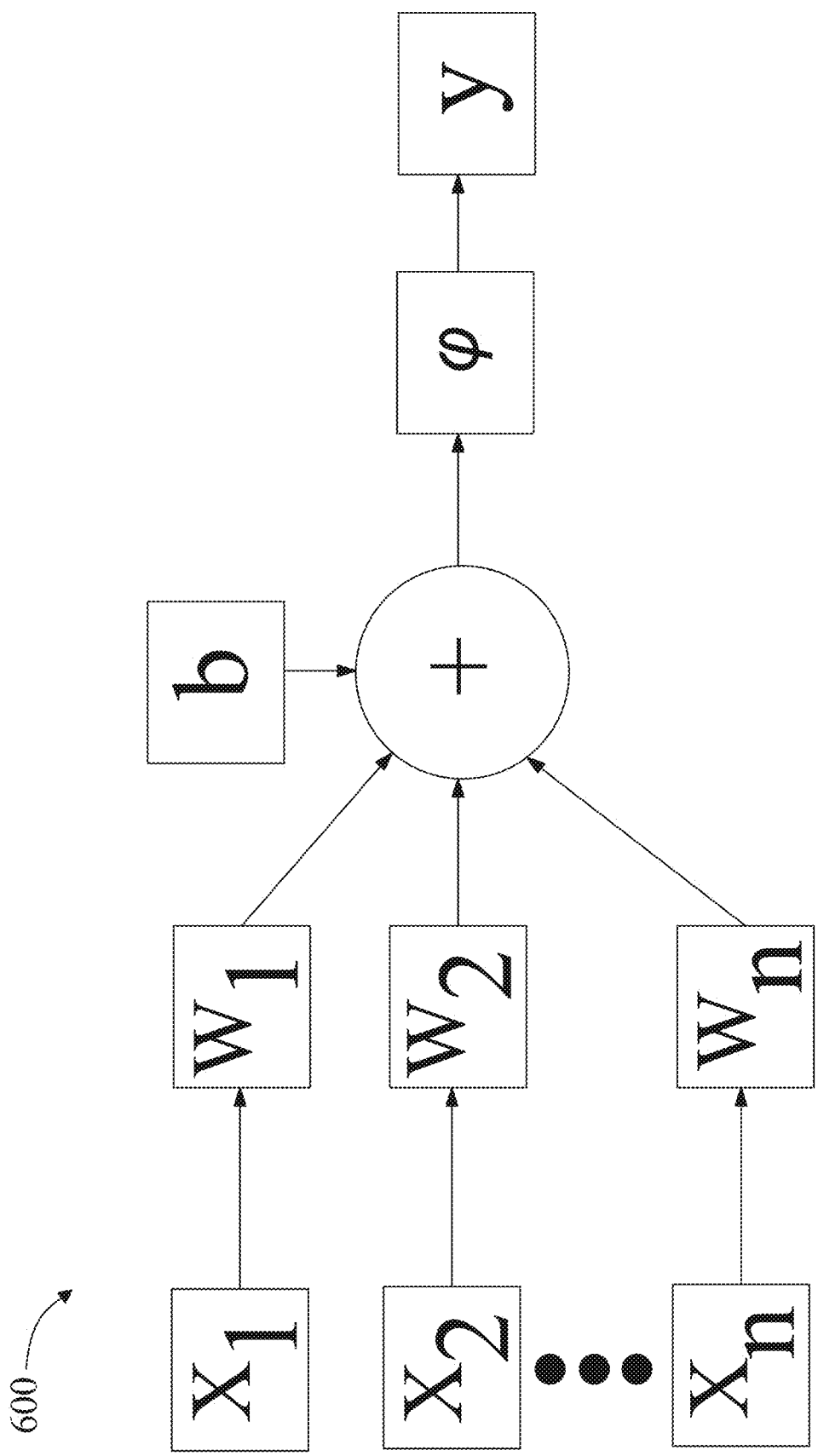
FIG. 6 is a diagram of an exemplary embodiment of a node of a neural network.

Referring now to FIG. 6, an exemplary embodiment of a node 600 of a neural network is illustrated. A node may include, without limitation, a plurality of inputs xi that may receive numerical values from inputs to a neural network containing the node and/or from other nodes. Node may perform one or more activation functions to produce its output given one or more inputs, such as without limitation computing a binary step function comparing an input to a threshold value and outputting either a logic 1 or logic 0 output or something equivalent, a linear activation function whereby an output is directly proportional to the input, and/or a non-linear activation function, wherein the output is not proportional to the input. Non-linear activation functions may include, without limitation, a sigmoid function of the form $$f(x) = \frac{1}{1 - e^{-x}}$$

given input x, a tanh (hyperbolic tangent) function, of the form $$\frac{e^x - e^{-x}}{e^x + e^{-x}},$$

a tanh derivative function such as $f(x)=\tanh^2(x)$, a rectified linear unit function such as $f(x)=\max(0, x)$, a "leaky" and/or "parametric" rectified linear unit function such as $f(x)=\max(ax, x)$ for some a, an exponential linear units function such as $$f(x) = \begin{cases} x & \text{for } x \geq 0 \\ \alpha(e^x - 1) & \text{for } x < 0 \end{cases}$$

for some value of a (this function may be replaced and/or weighted by its own derivative in some embodiments), a softmax function such as $$f(x_i) = \frac{e^x}{\sum_i x_i}$$

where the inputs to an instant layer are $x_i$, a swish function such as $f(x)=x*\text{sigmoid}(x)$, a Gaussian error linear unit function such as $f(x)=a(1+\tanh(\sqrt{2/\pi}(x+bx^r)))$ for some values of a, b, and r, and/or a scaled exponential linear unit function such as $$f(x) = \lambda \begin{cases} \alpha(e^x - 1) & \text{for } x < 0 \\ x & \text{for } x \geq 0 \end{cases}.$$

Fundamentally, there is no limit to the nature of functions of inputs xi that may be used as activation functions. As a non-limiting and illustrative example, node may perform a weighted sum of inputs using weights w; that are multiplied by respective inputs xi. Additionally, or alternatively, a bias b may be added to the weighted sum of the inputs such that an offset is added to each unit in the neural network layer that is independent of the input to the layer. The weighted sum may then be input into a function φ, which may generate one or more outputs y. Weight $w_i$ applied to an input $x_i$ may indicate whether the input is "excitatory," indicating that it has strong influence on the one or more outputs y, for instance by the corresponding weight having a large numerical value, and/or a "inhibitory," indicating it has a weak effect influence on the one more inputs y, for instance by the corresponding weight having a small numerical value. The values of weights $w_i$ may be determined by training a neural network using training data, which may be performed using any suitable process as described above.

Figure 7:
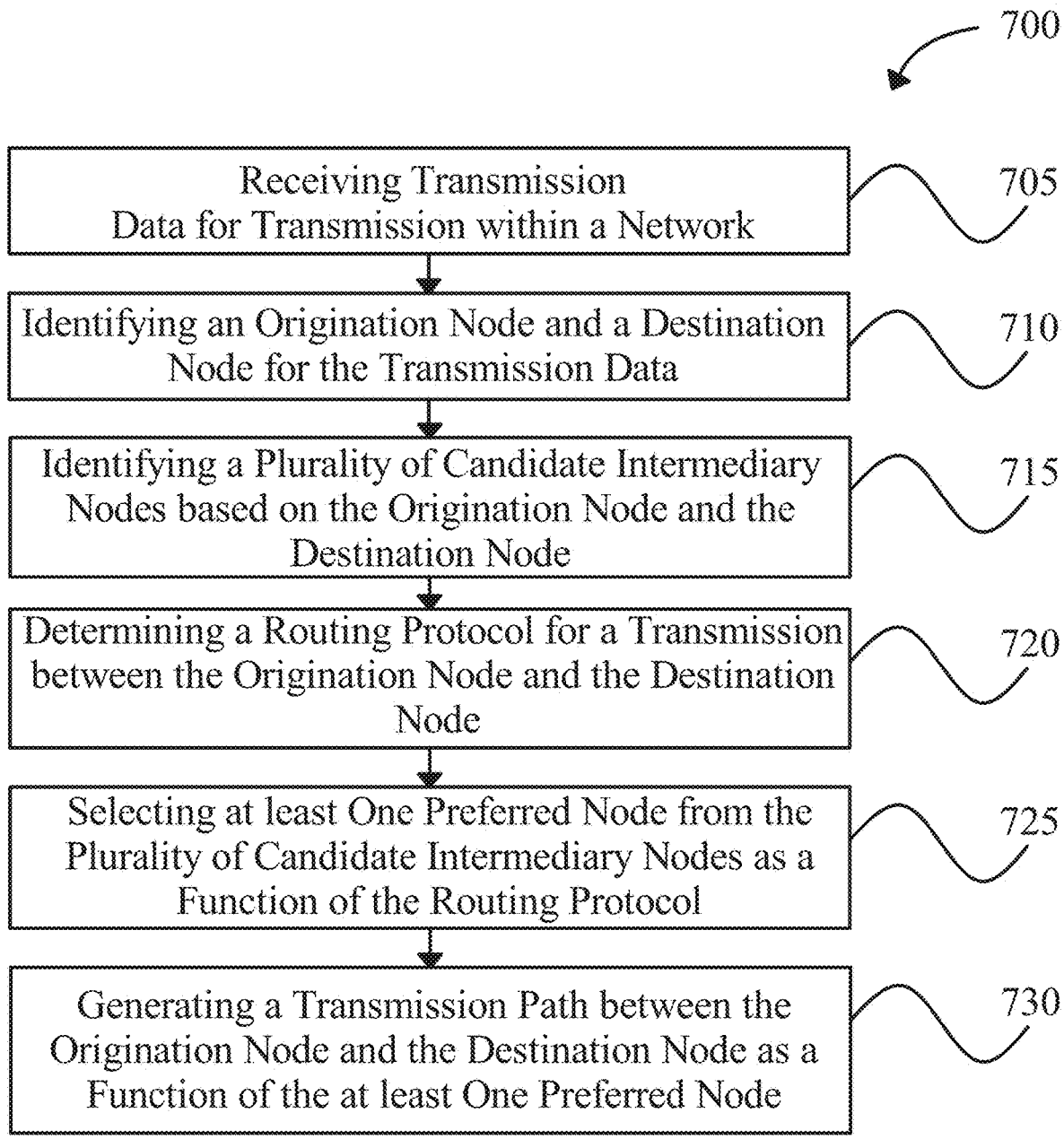
FIG. 7 is a flow diagram illustrating an exemplary embodiment of a method for network path generation.

Referring now to FIG. 7, a method 700 for network path generation is described. At step 705, method 700 includes receiving, by at least a processor, a transmission data for transmission within a network. This may be implemented with reference to FIGS. 1-6 and without limitation.

With continued reference to FIG. 7, at step 710, method 700 includes identifying, by the at least a processor, an origination node and a destination node for the transmission data. This may be implemented with reference to FIGS. 1-6 and without limitation.

With continued reference to FIG. 7, at step 715, method 700 includes identifying, by the at least a processor, a plurality of candidate intermediary nodes based on the origination node the destination node. This may be implemented with reference to FIGS. 1-6 and without limitation.

With continued reference to FIG. 7, at step 720, method 700 includes determining, by the at least a processor, a routing protocol for a transmission between the origination node and the destination node. This may be implemented with reference to FIGS. 1-6 and without limitation.

With continued reference to FIG. 7, at step 725, method 700 includes selecting, by the at least a processor, at least one preferred node from the plurality of candidate intermediary nodes as a function of the routing protocol. This may be implemented with reference to FIGS. 1-6 and without limitation.

Still referring to FIG. 7, at step 730, method 700 includes generating, by the at least a processor, a transmission path between the origination node and the destination node as a function of the selecting of the at least one preferred node. This may be implemented with reference to FIGS. 1-6 and without limitation.

With further reference to FIG. 7, method 700 may include receiving, by the at least a processor, a communication plan priority. Further, additionally, or alternatively, method 700 may include selecting at least one preferred node of the plurality of candidate intermediary nodes may include updating the at least one preferred node as a function of the communication plan priority. This may be implemented with reference to FIGS. 1-6 and without limitation.

Continuing to reference FIG. 7, method 700 may include calculating, by the at least a processor, a latency interval for the transmission path and comparing, by the at least a processor, the latency interval of the transmission path and a latency requirement for the transmission data. Further, additionally, or alternatively, method 700 may include selecting at least one preferred node from the plurality of candidate intermediary nodes as a function of the routing protocol may include updating the at least one preferred node as a function of the comparison of the latency interval and the latency requirement. This may be implemented with reference to FIGS. 1-6 and without limitation.

Still referring to FIG. 7, method 700 may include receiving, by the at least a processor, a node security requirement and comparing, by the at least a processor, a node security level for each of the at least one preferred node and the node security requirement. Further, additionally, or alternatively, method 700 may include selecting at least one preferred node of the plurality from candidate intermediary nodes as a function of the routing protocol may include updating the at least one preferred node as a function of the comparison of each of the node security level and the node security requirement. This may be implemented with reference to FIGS. 1-6 and without limitation.

Still referring to FIG. 7, method 700 may include determining, by the at least a processor, a capability capacity of the transmission path and comparing, by the at least a processor, the capacity of the transmission path and a capability requirement for a transmission. Further, additionally, or alternatively, method 700 may include selecting at least one preferred node from the plurality of candidate intermediary nodes as a function of the routing protocol may include updating the at least one preferred node as a function of the comparison the capability capacity and the capability requirement. This may be implemented with reference to FIGS. 1-6 and without limitation.

Still referring to FIG. 7, method 700 may include determining, by the at least a processor, a hop count of the transmission path and comparing, by the at least a processor, the hop count and a hop limit for a transmission. Further, additionally, or alternatively, method 700 may include selecting at least one preferred node from the plurality of candidate intermediary nodes as a function of the routing protocol may include updating the at least one preferred node as a function of the comparison the hop count and the hop limit. This may be implemented with reference to FIGS. 1-6 and without limitation.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 8:
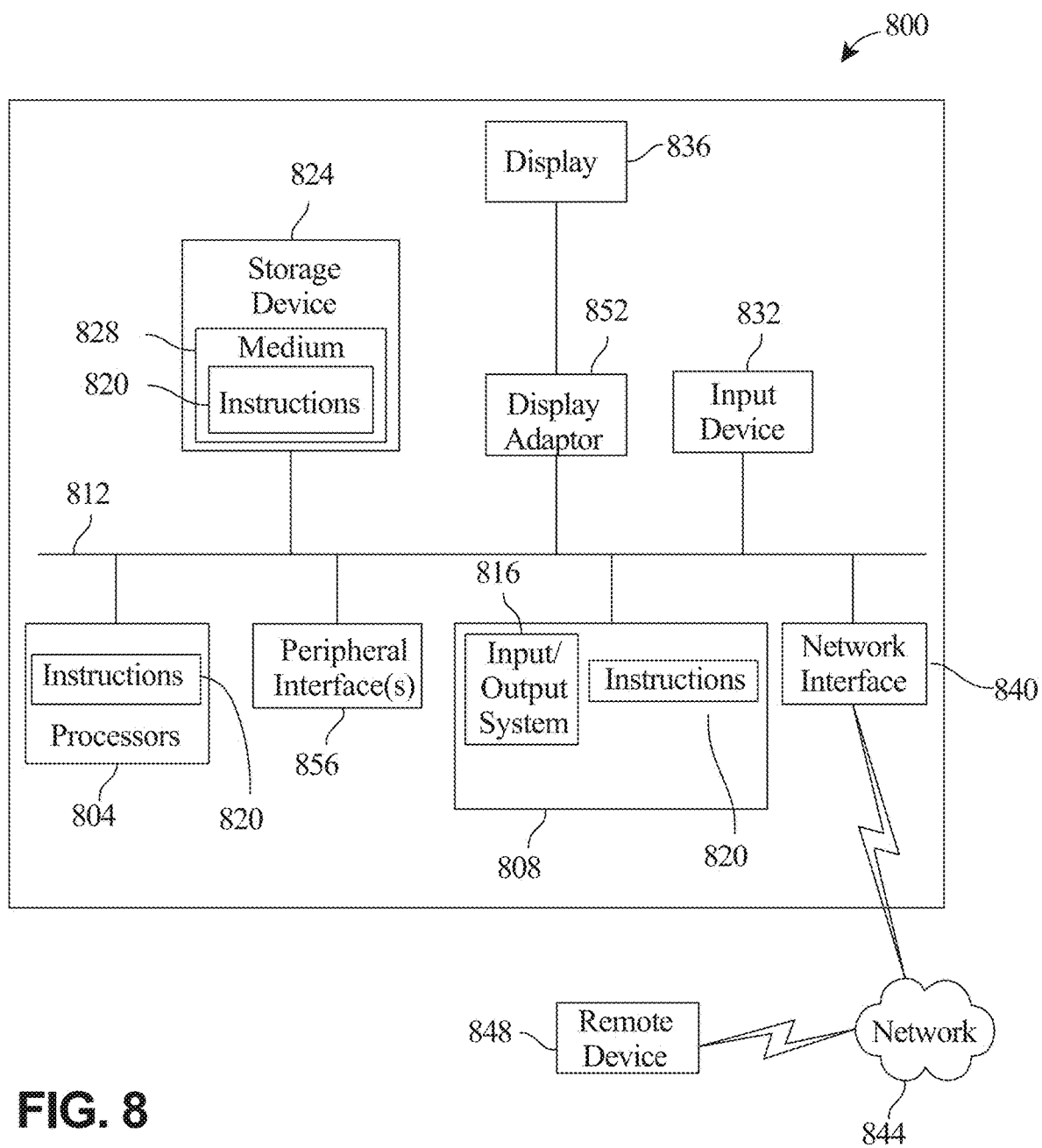
FIG. 8 is a block diagram of a computing system that can be used to implement any one or more of the methodologies disclosed herein and any one or more portions thereof.

FIG. 8 shows a diagrammatic representation of one embodiment of a computing device in the exemplary form of a computer system 800 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 800 includes a processor 804 and a memory 808 that communicate with each other, and with other components, via a bus 812. Bus 812 may include any of several types of bus structures including, but not limited to, a memory bus, a memory controller, a peripheral bus, a local bus, and any combinations thereof, using any of a variety of bus architectures.

Processor 804 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 804 may be organized according to Von Neumann and/or Harvard architecture as a non-limiting example. Processor 804 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), system on module (SOM), and/or system on a chip (SoC).

Memory 808 may include various components (e.g., machine-readable media) including, but not limited to, a random-access memory component, a read only component, and any combinations thereof. In one example, a basic input/output system 816 (BIOS), including basic routines that help to transfer information between elements within computer system 800, such as during start-up, may be stored in memory 808. Memory 808 may also include (e.g., stored on one or more machine-readable media) instructions (e.g., software) 820 embodying any one or more of the aspects and/or methodologies of the present disclosure. In another example, memory 808 may further include any number of program modules including, but not limited to, an operating system, one or more application programs, other program modules, program data, and any combinations thereof.

Computer system 800 may also include a storage device 824. Examples of a storage device (e.g., storage device 824) include, but are not limited to, a hard disk drive, a magnetic disk drive, an optical disc drive in combination with an optical medium, a solid-state memory device, and any combinations thereof. Storage device 824 may be connected to bus 812 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 824 (or one or more components thereof) may be removably interfaced with computer system 800 (e.g., via an external port connector (not shown)). Particularly, storage device 824 and an associated machine-readable medium 828 may provide nonvolatile and/or volatile storage of machine-readable instructions, data structures, program modules, and/or other data for computer system 800. In one example, software 820 may reside, completely or partially, within machine-readable medium 828. In another example, software 820 may reside, completely or partially, within processor 804.

Computer system 800 may also include an input device 832. In one example, a user of computer system 800 may enter commands and/or other information into computer system 800 via input device 832. Examples of an input device 832 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 832 may be interfaced to bus 812 via any of a variety of interfaces (not shown) including, but not limited to, a serial interface, a parallel interface, a game port, a USB interface, a FIREWIRE interface, a direct interface to bus 812, and any combinations thereof. Input device 832 may include a touch screen interface that may be a part of or separate from display 836, discussed further below. Input device 832 may be utilized as a user selection device for selecting one or more graphical representations in a graphical interface as described above.

A user may also input commands and/or other information to computer system 800 via storage device 824 (e.g., a removable disk drive, a flash drive, etc.) and/or network interface device 840. A network interface device, such as network interface device 840, may be utilized for connecting computer system 800 to one or more of a variety of networks, such as network 844, and one or more remote devices 848 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 844, may employ a wired and/or a wireless mode of communication. In general, any network topology may be used. Information (e.g., data, software 820, etc.) may be communicated to and/or from computer system 800 via network interface device 840.

Computer system 800 may further include a video display adapter 852 for communicating a displayable image to a display device, such as display device 836. Examples of a display device include, but are not limited to, a liquid crystal display (LCD), a cathode ray tube (CRT), a plasma display, a light emitting diode (LED) display, and any combinations thereof. Display adapter 852 and display device 836 may be utilized in combination with processor 804 to provide graphical representations of aspects of the present disclosure. In addition to a display device, computer system 800 may include one or more other peripheral output devices including, but not limited to, an audio speaker, a printer, and any combinations thereof. Such peripheral output devices may be connected to bus 812 via a peripheral interface 856. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods and systems according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A system for network path generation, the system comprising:

at least a processor; and a memory communicatively connected to the at least a processor, the memory containing instructions configuring the at least a processor to:

receive transmission data for transmission within a network;

identify an origination node and a destination node for the transmission data;

identify a plurality of candidate intermediary nodes based on the origination node the destination node;

determine a routing protocol for a transmission between the origination node and the destination node;

select at least one preferred node from the plurality of candidate intermediary nodes as a function of the routing protocol, wherein the at least a processor is further configured to receive a communication plan priority comprising a collection of data indicating an order of priority of form of communications, wherein selecting the at least one preferred node as a function of the routing protocol further comprises updating the at least one preferred node based on the communication plan priority;

generate a transmission path between the origination node and the destination node as a function of the at least one preferred node.

2. The system of claim 1, wherein selecting at least one preferred node of the plurality of candidate intermediary nodes comprises updating the at least one preferred node as a function of the communication plan priority.

3. The system of claim 1, wherein the at least a processor is further configured to:

calculate a latency interval for the transmission path; and compare the latency interval of the transmission path and a latency requirement for the transmission data.

4. The system of claim 3, wherein selecting at least one preferred node from the plurality of candidate intermediary nodes as a function of the routing protocol comprises:

updating the at least one preferred node as a function of a comparison of the latency interval and the latency requirement.

5. The system of claim 1, wherein the at least a processor is further configured to:

receive a node security requirement; and compare a node security level for each of the at least one preferred node and the node security requirement.

6. The system of claim 5, wherein selecting at least one preferred node of the plurality from candidate intermediary nodes as a function of the routing protocol comprises:

updating the at least one preferred node as a function of a comparison of each of the node security level and the node security requirement.

7. The system of claim 1, wherein the at least a processor is further configured to:

determine a capability capacity of the transmission path; and compare the capability capacity of the transmission path and a capability requirement for a transmission.

8. The system of claim 7, wherein selecting at least one preferred node from the plurality of candidate intermediary nodes as a function of the routing protocol comprises:

updating the at least one preferred node as a function of a comparison of the capability capacity and the capability requirement.

9. The system of claim 1, wherein the at least a processor is further configured to:

determine a hop count of the transmission path; and compare the hop count and a hop limit for a transmission.

10. A method for network path generation, comprising:
receiving, by at least a processor, transmission data for transmission within a network;
identifying, by the at least a processor, an origination node and a destination node for the transmission data;
identifying, by the at least a processor, a plurality of candidate intermediary nodes based on the origination node the destination node;
determining, by the at least a processor, a routing protocol for a transmission between the origination node and the destination node;
selecting, by the at least a processor, at least one preferred node from the plurality of candidate intermediary nodes as a function of the routing protocol, wherein the at least a processor is further configured to receive a communication plan priority comprising a collection of data indicating an order of priority of form of communications, wherein selecting the at least one preferred node as a function of the routing protocol further comprises updating the at least one preferred node based on the communication plan priority; and
generating, by the at least a processor, a transmission path between the origination node and the destination node as a function of the at least one preferred node.

11. The method of claim 10, wherein selecting at least one preferred node of the plurality of candidate intermediary nodes comprises updating the at least one preferred node as a function of the communication plan priority.

12. The method of claim 10, further comprising:
calculating, by the at least a processor, a latency interval for the transmission path; and
comparing, by the at least a processor, the latency interval of the transmission path and a latency requirement for the transmission data.

13. The method of claim 12, wherein selecting at least one preferred node from the plurality of candidate intermediary nodes as a function of the routing protocol comprises:
updating the at least one preferred node as a function of a comparison of the latency interval and the latency requirement.

14. The method of claim 10, wherein the at least a processor is further configured to:
receiving, by the at least a processor, a node security requirement; and
comparing, by the at least a processor, a node security level for each of the at least one preferred node and the node security requirement.

15. The method of claim 14, wherein selecting at least one preferred node of the plurality from candidate intermediary nodes as a function of the routing protocol comprises:
updating the at least one preferred node as a function of a comparison of each of the node security level and the node security requirement.

16. The method of claim 10, further comprising:
determining, by the at least a processor, a capability capacity of the transmission path; and
comparing, by the at least a processor, the capability capacity of the transmission path and a capability requirement for a transmission.

17. The method of claim 16, wherein selecting at least one preferred node from the plurality of candidate intermediary nodes as a function of the routing protocol comprises:
updating the at least one preferred node as a function of a comparison of the capability capacity and the capability requirement.

18. The method of claim 10, further comprising:
determining, by the at least a processor, a hop count of the transmission path; and
comparing, by the at least a processor, the hop count and a hop limit for a transmission.

* * * * *